(12) United States Patent
Abraham et al.

(10) Patent No.: US 9,813,920 B2
(45) Date of Patent: Nov. 7, 2017

(54) SYSTEMS AND METHODS FOR TRANSMITTING AND RECEIVING DISCOVERY MESSAGES

(71) Applicant: QUALCOMM Incorporated, San Diego, CA (US)

(72) Inventors: Santosh Paul Abraham, San Diego, CA (US); George Cherian, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 798 days.

(21) Appl. No.: 14/029,602

(22) Filed: Sep. 17, 2013

(65) Prior Publication Data

US 2014/0082185 A1 Mar. 20, 2014

Related U.S. Application Data

(60) Provisional application No. 61/703,216, filed on Sep. 19, 2012, provisional application No. 61/723,917, filed on Nov. 8, 2012.

(51) Int. Cl.
*G06F 15/173* (2006.01)
*H04W 24/00* (2009.01)
(Continued)

(52) U.S. Cl.
CPC ........... *H04W 24/00* (2013.01); *H04W 8/005* (2013.01); *H04W 48/08* (2013.01); *H04W 84/18* (2013.01)

(58) Field of Classification Search
CPC ................................ H04L 41/12; H04L 45/02
(Continued)

(56) References Cited

U.S. PATENT DOCUMENTS 7,502,360 B2 * 3/2009 Liu .................. H04W 40/24
370/347
7,974,574 B2 * 7/2011 Shen .................. H04W 48/14
455/11.1
(Continued)

OTHER PUBLICATIONS

International Search Report and Written Opinion—PCT/US2013/060319—ISA/EPO—Feb. 18, 2014.

*Primary Examiner* — Kristie Shingles
(74) *Attorney, Agent, or Firm* — Knobbe, Martens, Olson & Bear, LLP

(57) ABSTRACT

Methods, devices, and computer program products for transmitting and receiving discovery messages in a wireless communication device are described herein. One aspect of the subject matter described in the disclosure provides a method of discovering devices in a wireless communication system. The method includes receiving a first discovery message from a first device of a device cluster comprising a plurality of devices during a first discovery interval. The first discovery message includes information associated with the device cluster. The method further includes transmitting a discovery trigger message in response to the first discovery message. The method further includes receiving a second discovery message from at least one device of device cluster during a second discovery interval. The second discovery message is configured to advertise a plurality of services provided by the at least one device of the device cluster in response to the discovery trigger message.

37 Claims, 10 Drawing Sheets

(51) Int. Cl.
*H04W 8/00* (2009.01)
*H04W 48/08* (2009.01)
*H04W 84/18* (2009.01)

(58) Field of Classification Search
USPC .......................................................... 709/224
See application file for complete search history.

(56) References Cited

U.S. PATENT DOCUMENTS

| | | | | |
|---|---|---|---|---|
| 8,009,587 | B2 * | 8/2011 | Tsigler | H04W 92/12 370/254 |
| 8,081,610 | B2 * | 12/2011 | Stirbu | H04W 8/18 370/338 |
| 8,532,095 | B2 * | 9/2013 | Mammoliti | H04L 41/0806 370/389 |
| 8,681,691 | B2 * | 3/2014 | Shen | H04W 76/02 370/328 |
| 9,084,180 | B2 * | 7/2015 | Sampath | H04W 48/16 |
| 2005/0177639 | A1 | 8/2005 | Reunamaki et al. | |
| 2009/0245133 | A1 | 10/2009 | Gupta et al. | |
| 2010/0271959 | A1 | 10/2010 | Qi et al. | |
| 2011/0028093 | A1 | 2/2011 | Patel et al. | |
| 2011/0113252 | A1 | 5/2011 | Krischer et al. | |
| 2011/0153818 | A1 | 6/2011 | Vandwalle et al. | |
| 2013/0155900 | A1 | 6/2013 | Sampath et al. | |
| 2013/0157670 | A1 | 6/2013 | Koskela et al. | |
| 2013/0201979 | A1 * | 8/2013 | Iyer | H04W 84/12 370/338 |
| 2013/0250810 | A1 * | 9/2013 | Ho | H04L 45/02 370/255 |
| 2014/0064487 | A1 * | 3/2014 | Abraham | H04L 63/045 380/270 |
| 2014/0133394 | A1 * | 5/2014 | Abraham | H04W 48/14 370/328 |
| 2014/0153444 | A1 * | 6/2014 | Zhou | H04W 40/12 370/256 |

* cited by examiner

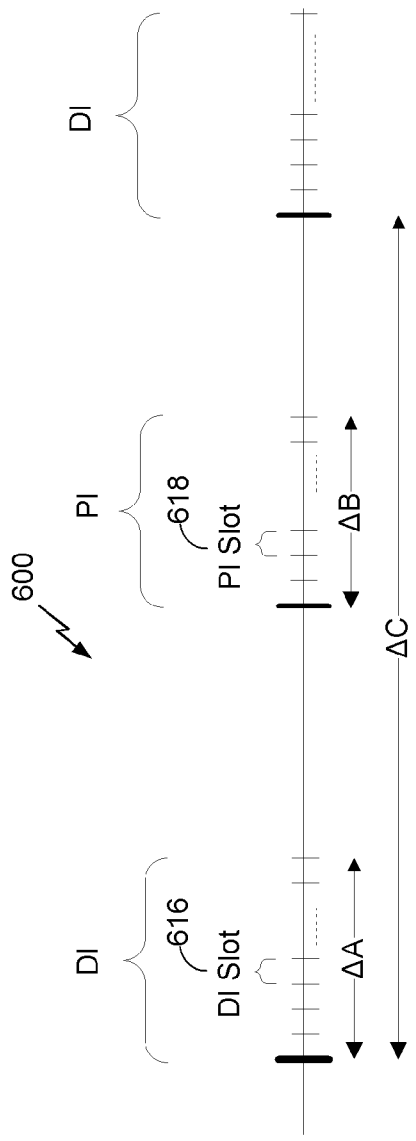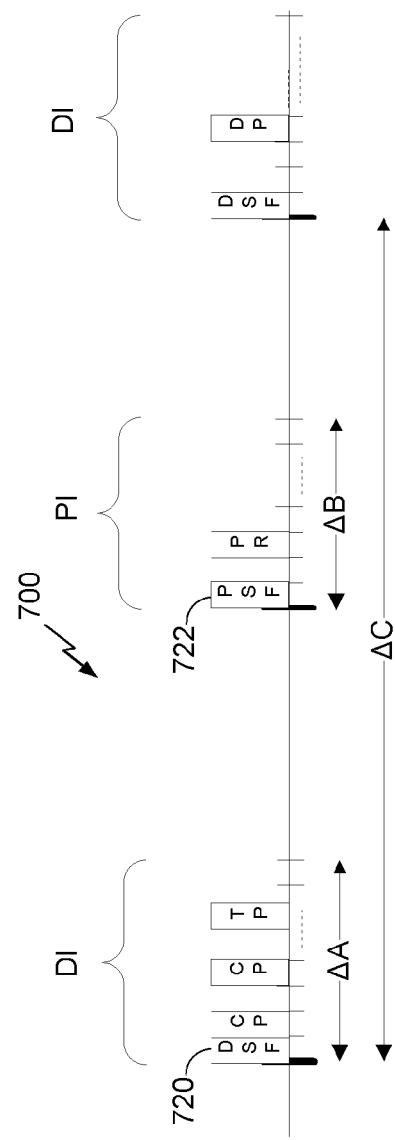
FIG. 6
FIG. 7

SYSTEMS AND METHODS FOR TRANSMITTING AND RECEIVING DISCOVERY MESSAGES

CROSS-REFERENCE TO RELATED APPLICATIONS

The present application claims priority to provisional U.S. Application Ser. No. 61/703,216, entitled "Systems and Methods for Transmitting and Receiving Discovery Messages," filed Sep. 19, 2012, assigned to the assignee hereof and incorporated herein by reference in its entirety. The present application also claims priority to provisional U.S. Application Ser. No. 61/723,917, entitled "Systems and Methods for Transmitting and Receiving Discovery Messages," filed Nov. 8, 2012, assigned to the assignee hereof and incorporated herein by reference in its entirety.

FIELD

The present application relates generally to wireless communications, and more specifically to systems, methods, and devices for securely transmitting and receiving discovery messages.

BACKGROUND

In many telecommunication systems, communications networks are used to exchange messages among several interacting spatially-separated devices. Networks can be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

Devices in a wireless network can transmit and/or receive information to and from each other. The information can include packets, which in some aspects can be referred to as data units. The packets can include overhead information (e.g., header information, packet properties, etc.) that helps in routing the packets through the network, identifying the data in the packets, processing the packets, etc. The packets can further include data, such as user data, multimedia content, etc. that can be carried in a payload of the packet. Packets can additionally be used to introduce two different devices communicating on a medium. Because the medium can be shared by multiple devices seeking to access the medium, improved systems, methods, and devices for introducing devices on the medium are desired.

SUMMARY

The systems, methods, devices, and computer program products discussed herein each have several aspects, no single one of which is solely responsible for its desirable attributes. Without limiting the scope of this invention as expressed by the claims which follow, some features are discussed briefly below. After considering this discussion, and particularly after reading the section entitled "Detailed Description," it will be understood how advantageous features of this invention include reduced power consumption when introducing devices on a medium.

One aspect of the subject matter described in the disclosure provides a method of discovering devices in a wireless communication system. The method includes receiving a first discovery message from a first device of a device cluster comprising a plurality of devices during a first discovery interval. The first discovery message includes information associated with the device cluster. The method further includes transmitting a discovery trigger message in response to the first discovery message. The method further includes receiving a second discovery message from at least one device of device cluster during a second discovery interval. The second discovery message is configured to advertise a plurality of services provided by the at least one device of the device cluster in response to the discovery trigger message.

Another aspect of the subject matter described in the disclosure provides a wireless device configured to discover devices in a wireless communication system. The device includes a receiver configured to receive a first discovery message from a first device of a device cluster comprising a plurality of devices during a first discovery interval. The first discovery message includes information associated with the device cluster. The device further includes a transmitter configured to transmit a discovery trigger message in response to the first discovery message. The receiver is further configured to receive a second discovery message from at least one device of the device cluster during a second discovery interval. The second discovery message is configured to advertise a plurality of services provided by the at least one device of the device cluster in response to the discovery trigger message.

Another aspect of the subject matter described in the disclosure provides an apparatus for discovering devices in a wireless communication system. The apparatus includes means for receiving a first discovery message from a first device of a device cluster comprising a plurality of devices during a first discovery interval. The first discovery message includes information associated with the device cluster. The apparatus further includes means for transmitting a discovery trigger message in response to the first discovery message. The apparatus further includes means for receiving a second discovery message from at least one device of the device cluster, during a second discovery interval. The second discovery message is configured to advertise a plurality of services provided by the at least one device of the device cluster in response to the discovery trigger message.

Another aspect of the subject matter described in the disclosure provides a non-transitory computer-readable medium includes code that, when executed, causes an apparatus to receive a first discovery message from a first device of a device cluster comprising a plurality of devices during a first discovery interval. The first discovery message includes information associated with the device cluster. The medium further includes code that, when executed, causes the apparatus to transmit a discovery trigger message in response to the first discovery message. The medium further includes code that, when executed, causes the apparatus to receive a second discovery message from at least one device of the device cluster during a second discovery interval. The second discovery message is configured to advertise a plurality of services provided by the at least one device of the device cluster in response to the discovery trigger message.

BRIEF DESCRIPTION OF THE DRAWINGS

FIG. 6 illustrates an exemplary communication timeline in a wireless communication system in accordance with aspects of the present disclosure.

FIG. 7 illustrates an exemplary communication timeline in a wireless communication system in accordance with aspects of the present disclosure.

DETAILED DESCRIPTION

Figure 1:
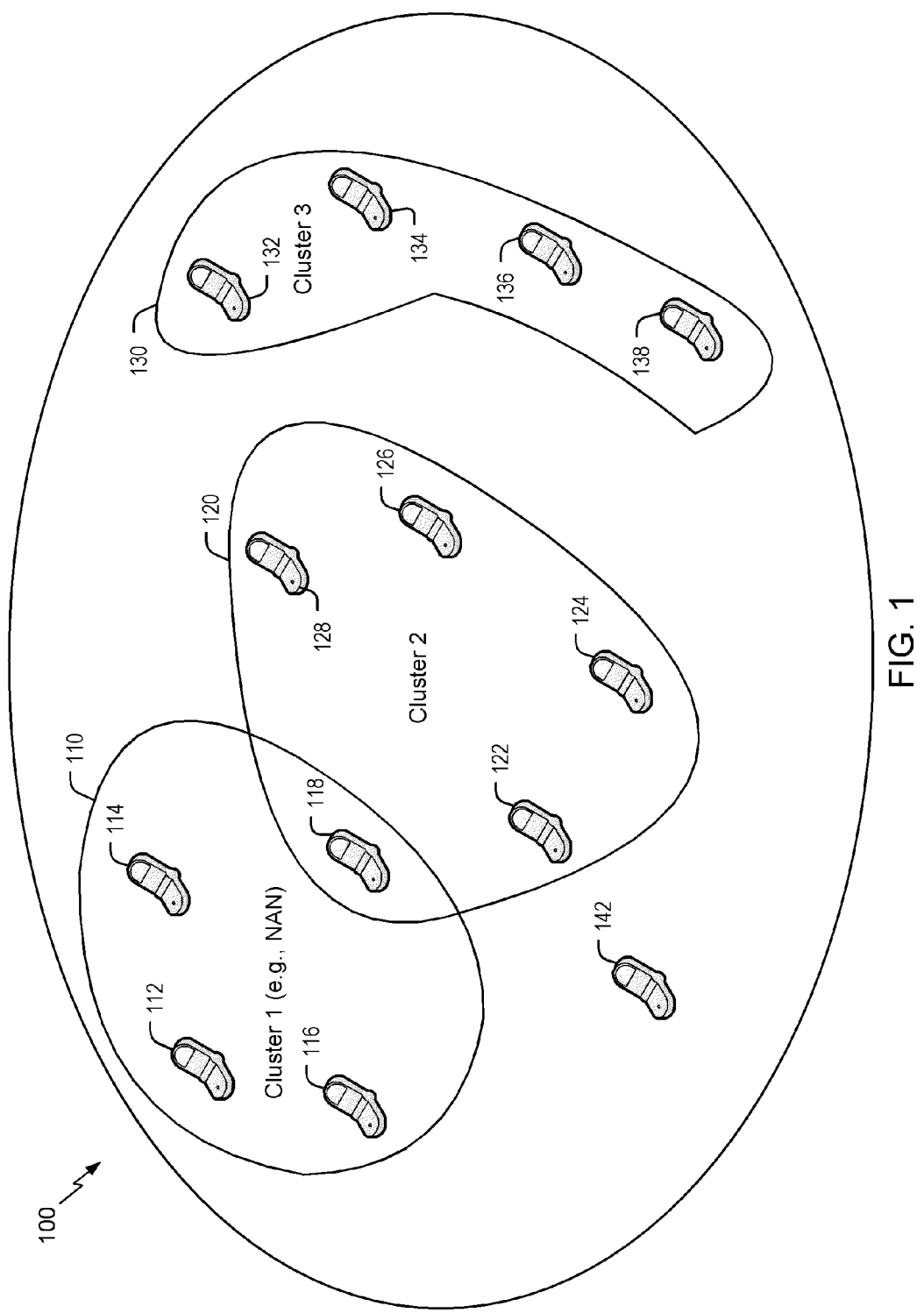
FIG. 1 illustrates an example of a wireless communication system in which aspects of the present disclosure can be employed.

The word "exemplary" is used herein to mean "serving as an example, instance, or illustration." Any embodiment described herein as "exemplary" is not necessarily to be construed as preferred or advantageous over other embodiments. Various aspects of the novel systems, apparatuses, and methods are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies can include various types of wireless local area networks (WLANs). A WLAN can be used to interconnect nearby devices together, employing widely used networking protocols. The various aspects described herein can apply to any communication standard, such as a wireless protocol.

In some implementations, a WLAN includes various devices which are the components that access the wireless network. For example, clients (also referred to as stations or "STAs"). For example, an STA can be a laptop computer, a personal digital assistant (PDA), a mobile phone, etc. In an example, an STA connects to other STAs via a WiFi (e.g., IEEE 802.11 protocol) compliant wireless link to obtain general connectivity to the Internet or to other wide area networks.

A station "STA" can also include, be implemented as, or known as an access terminal ("AT"), a subscriber station, a subscriber unit, a mobile station, a mobile device, a remote station, a remote terminal, a user terminal, a user agent, a user device, user equipment, or some other terminology. In some implementations an access terminal can include a cellular telephone, a cordless telephone, a Session Initiation Protocol ("SIP") phone, a wireless local loop ("WLL") station, a personal digital assistant ("PDA"), a handheld device having wireless connection capability, or some other suitable processing device or wireless device connected to a wireless modem. Accordingly, one or more aspects taught herein can be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

Devices, such as a group of stations, for example, can be used in a neighborhood aware network (NAN), or social-WiFi network. For example, various stations within the network can communicate on a device to device (e.g., peer-to-peer communications) basis with one another regarding applications that each of the stations support. It is desirable for a discovery protocol used in a social-WiFi network to enable mobile devices to advertise themselves (e.g., by sending discovery packets or messages) as well as discover services provided by other STAs (e.g., by sending paging or query packets or messages), while ensuring secure communication and low power consumption.

FIG. 1 illustrates an example of a wireless communication system 100 in which aspects of the present disclosure can be employed. The wireless communication system 100 includes a first mobile device cluster 110, a second mobile device cluster 120, a third mobile device cluster 130, and a mobile device 142.

The first mobile device cluster 110 includes a mobile device 112, a mobile device 114, a mobile device 116, and a mobile device 118. The second mobile device cluster 120 includes the mobile device 118, a mobile device 122, a mobile device 124, a mobile device 126, and a mobile device 128. The third mobile device cluster 130 includes a mobile device 132, a mobile device 134, a mobile device 136, and a mobile device 138. In the particular example of FIG. 1, the mobile device 142 has not joined (e.g., is not a member of) any of the mobile device clusters 110, 120, 130. Further, in the particular example of FIG. 1, the mobile device 118 has joined (e.g., is a member of) multiple mobile device clusters (i.e., the mobile device clusters 110, 120).

The wireless communication system 100 can include mobile devices 112, 114, 116, 118, 122, 124, 126, 128, 132, 134, 136, and 138, which can communicate with other mobile devices 112, 114, 116, 118, 122, 124, 126, 128, 132, 134, 136, and 138. As an example, the mobile device 112 can communicate with the mobile device 116. As another example, the mobile device 112 can communicate with the mobile device 118, although this communication link is not illustrated in FIG. 1.

A variety of processes and methods can be used for transmissions in the wireless communication system 100 between an individual mobile device 112, 114, 116, 118, 122, 124, 126, 128, 132, 134, 136, and 138, such as the mobile device 112, and another individual mobile device, such as the mobile device 114. For example, signals can be sent and received in accordance with OFDM/OFDMA techniques. If this is the case, the wireless communication system 100 can be referred to as an OFDM/OFDMA system. Alternatively, signals can be sent and received between an individual mobile device 112, 114, 116, 118, 122, 124, 126, 128, 132, 134, 136, and 138, such as the mobile device 112, and another individual mobile device, such as the mobile device 114, in accordance with CDMA techniques. If this is the case, the wireless communication system 100 can be referred to as a CDMA system.

According to various embodiments, the wireless communication system 100 can be a neighborhood-aware network, and one or more of the mobile device clusters 110, 120, 130 can be associated with a particular common mobile device application. For example, each the mobile device clusters 110, 120, 130 can associated with a respective common mobile device application, such as a social networking mobile device application, a gaming mobile device application, or a combination thereof.

In operation, mobile devices of the wireless communication system 100 can communicate wirelessly according to one or more wireless communication protocols. For example, in at least one embodiment, mobile devices of the wireless communication system 100 can send and receive discovery messages, such as a discovery beacon associated with an Institute of Electrical and Electronics Engineers (IEEE) 802.11 protocol. As another example, mobile devices of the wireless communication system 100 can communicate via a network advertisement protocol that is common to each mobile device of the wireless communication system 100. As another example, the first mobile device cluster 110 can communicate using a second protocol that is different than the network advertisement protocol. Similarly, the second mobile device cluster 120 can communicate using a third protocol that is different than the network advertisement protocol, and the third mobile device cluster 130 can communicate using a fourth protocol that is different than the network advertisement protocol. In this context, a protocol refers to parameters used to communicate, such as a channel on which communications occur, timing of communications (e.g., timing of discovery intervals), etc.

To further illustrate, the mobile device 142 can turn on and remain in a listening state to receive a first discovery message via the network advertisement protocol common to the wireless communication system 100. In certain embodiments, a first discovery message can be sent periodically. In particular embodiments, mobile devices within a cluster can be commonly identified as associated with the cluster by the discovery message. For example, the mobile device 142 can receive the first discovery message from the mobile device 122. The first discovery message can include information specific to the second mobile device cluster 120, and can be referred to herein as a "cluster discovery message." For example, the information can indicate (e.g., advertise) the second mobile device cluster 120, such as by indicating characteristics of the protocol associated with the second mobile device cluster 120. The information can include an indication of a wireless channel associated with the second mobile device cluster 120 that can be different than a wireless channel associated with the network advertisement protocol. Alternatively or in addition, the information can include an indication of a timing parameter (e.g., a start time and/or a duration of a discovery interval) associated with the second mobile device cluster 120 that can be different than a timing parameter associated with the network advertisement protocol. Alternatively or in addition, the information can include a network size associated with the second mobile device cluster 120 (e.g., to enable mobile devices to determine whether to join the second mobile device cluster 120, for example based on whether an estimated bandwidth associated with the second mobile device cluster 120 is too small based on the network size exceeding a threshold). Alternatively or in addition, the information can include a duration of a discovery interval and/or a subsequent listening interval associated with the second mobile device cluster 120. Alternatively or in addition, the information can include cluster identifying information, such as information about a social networking mobile device application or a gaming mobile device application associated with the second mobile device cluster 120.

In response to receiving the first discovery message, the mobile device 142 can use the information in the first discovery message to communicate with the mobile device 122 using the protocol associated with the second mobile device cluster 120. For example, the mobile device 142 can join the second mobile device cluster 120, query a mobile device of the second mobile device cluster 120 for additional information (e.g., information related to a mobile device application) associated with the second mobile device cluster 120, or a combination thereof. Communicating with the mobile device 122 can include tuning a transceiver of the mobile device 142 from a first channel (associated with the network advertisement protocol) to the second channel (associated with the second mobile device cluster). After tuning to the second channel, the mobile device 142 can receive a second discovery message from the mobile device 122 at a time that is determined by a second timing parameter that is associated with the second mobile device cluster 120.

In another particular example, the mobile device 132 can send a second discovery message via the network advertisement protocol common to the wireless communication system 100. The second discovery message can include information specific to the third mobile device cluster 130. One or more other devices can receive the second discovery message. For example, the mobile device 128 can receive the second discovery message sent by the mobile device 132. The mobile device 132 can receive a message from the mobile device 128 that is sent based on the information specific to the third mobile device cluster 130. The message can be sent using the protocol associated with the third mobile device cluster 130. The message sent from the mobile device 128 can be a request to join the third mobile device cluster 130, a query for additional information related to the third mobile device cluster 130, or a combination thereof.

In a particular embodiment, each of the mobile device clusters 110, 120 and 130 can be advertised during a discovery interval associated with the network advertisement protocol common to the wireless communication system 100. For example, during a first discovery interval associated with the network advertisement protocol common to the wireless communication system 100, a particular device of the first mobile device cluster 110 (such as the mobile device 114) can send a discovery message advertising the first mobile device cluster 110. Additionally, during the first discovery interval, a particular device of the second mobile device cluster 120 (such as the mobile device 126) can send a discovery message advertising the second mobile device cluster 120. Further, during the first discovery interval, a particular device of the third mobile device cluster 130 (such as the mobile device 136) can send a discovery message advertising the third mobile device cluster 130. Thus, during the first discovery interval, the mobile device 142 can receive discovery messages associated with each of the mobile device clusters via the network advertisement protocol common to the wireless communication system 100 (e.g., by tuning to a channel associated with the network advertisement protocol common to the wireless communication system 100). Accordingly, the mobile device 142 does not have to scan a variety of channels (such as channels associated with each of the mobile device clusters 110, 120, and 130, to identify mobile device clusters that are active in a particular area.

It will be appreciated that utilizing the network advertisement protocol common to the wireless communication system 100 can enable transmission and reception of information related to particular clusters of mobile devices (e.g., any of the mobile device clusters 110, 120, 130). Further, by communicating according to cluster specific protocols that are different from the network advertisement protocol, each of the mobile device clusters 110, 120, 130 can tailor communications according to cluster-specific characteristics, such as one or more particular mobile device applications associated with the particular mobile device cluster.

Figure 2:
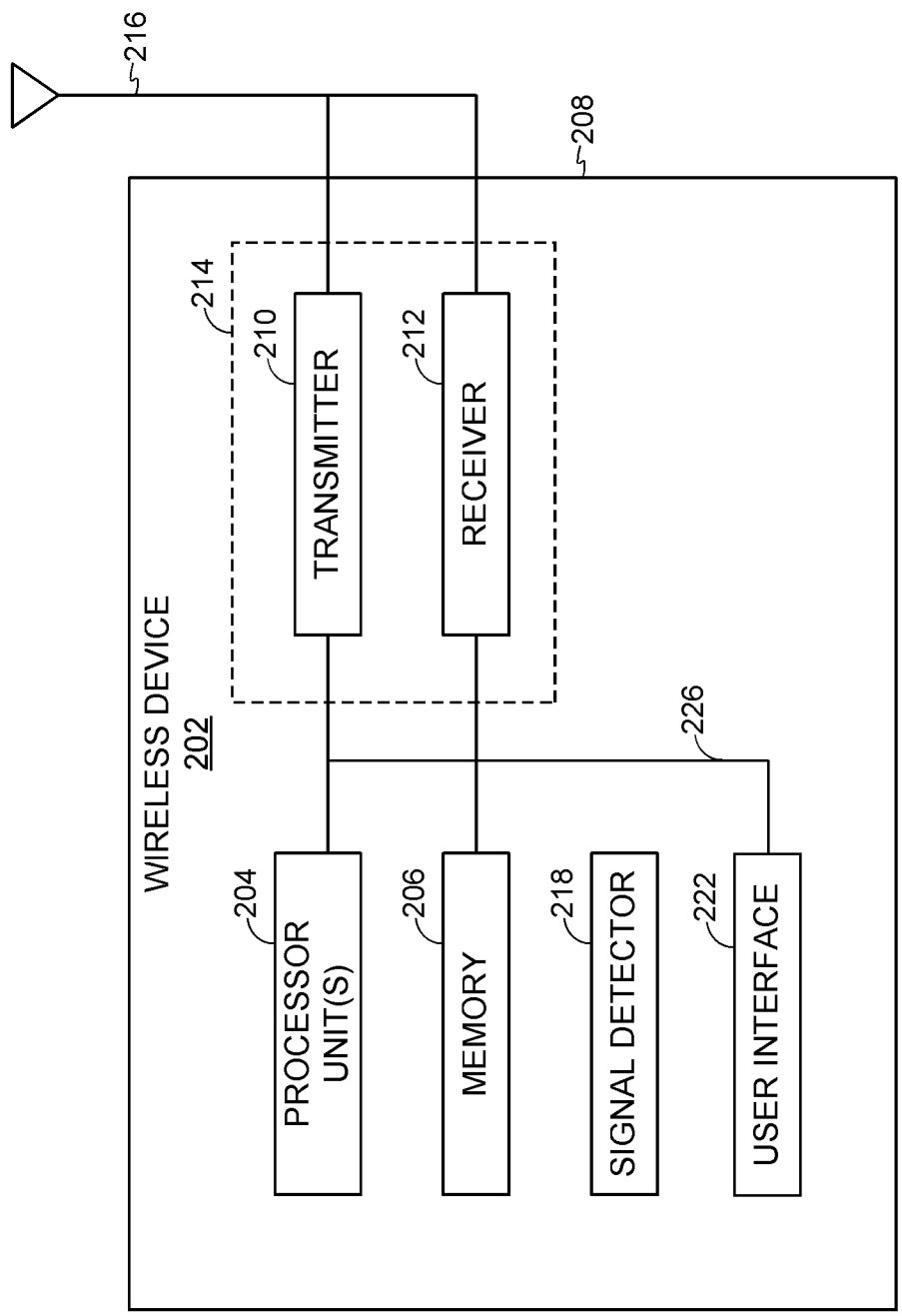
FIG. 2 shows a functional block diagram of a wireless device that can be employed within the wireless communication system of FIG. 1.

FIG. 2 illustrates various components that can be utilized in a wireless device 202 that can be employed within the wireless communication system 100. The wireless device 202 is an example of a device that can be configured to implement the various methods described herein. For example, the wireless device 202 can include one of the mobile devices.

The wireless device 202 can include a processor 204 which controls operation of the wireless device 202. The processor 204 can also be referred to as a central processing unit (CPU). Memory 206, which can include both read-only memory (ROM) and random access memory (RAM), can provide instructions and data to the processor 204. A portion of the memory 206 can also include non-volatile random access memory (NVRAM). The processor 204 typically performs logical and arithmetic operations based on program instructions stored within the memory 206. The instructions in the memory 206 can be executable to implement the methods described herein.

The processor 204 can include or be a component of a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system can also include machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The wireless device 202 can also include a housing 208 that can include a transmitter 210 and/or a receiver 212 to allow transmission and reception of data between the wireless device 202 and a remote location. The transmitter 210 and receiver 212 can be combined into a transceiver 214. An antenna 216 can be attached to the housing 208 and electrically coupled to the transceiver 214. The wireless device 202 can also include (not shown) multiple transmitters, multiple receivers, multiple transceivers, and/or multiple antennas.

The transmitter 210 can be configured to wirelessly transmit packets having different packet types or functions. For example, the transmitter 210 can be configured to transmit packets of different types generated by the processor 204. When the wireless device 202 is implemented or used as a mobile device, the processor 204 can be configured to process packets of a plurality of different packet types. For example, the processor 204 can be configured to determine the type of packet and to process the packet and/or fields of the packet accordingly. When the wireless device 202 is implemented or used as a mobile device, the processor 204 can also be configured to select and generate one of a plurality of packet types. For example, the processor 204 can be configured to generate a discovery packet (such as a cluster discovery message and/or a discovery message) and to determine what type of packet information to use in a particular instance.

The receiver 212 can be configured to wirelessly receive packets having different packet types. In some aspects, the receiver 212 can be configured to detect a type of a packet used and to process the packet accordingly.

The wireless device 202 can also include a signal detector 218 that can be used in an effort to detect and quantify the level of signals received by the transceiver 214. The signal detector 218 can detect such signals as total energy, energy per subcarrier per symbol, power spectral density and other signals. The wireless device 202 can also include a digital signal processor (DSP) 220 for use in processing signals. The DSP 220 can be configured to generate a packet for transmission. In some aspects, the packet can include a physical layer data unit (PPDU).

The wireless device 202 can further include a user interface 222 in some aspects. The user interface 222 can include a keypad, a microphone, a speaker, and/or a display. The user interface 222 can include any element or component that conveys information to a user of the wireless device 202 and/or receives input from the user.

The various components of the wireless device 202 can be coupled together by a bus system 226. The bus system 226 can include a data bus, for example, as well as a power bus, a control signal bus, and a status signal bus in addition to the data bus. The components of the wireless device 202 can be coupled together or accept or provide inputs to each other using some other mechanism.

Although a number of separate components are illustrated in FIG. 2, one or more of the components can be combined or commonly implemented. For example, the processor 204 can be used to implement not only the functionality described above with respect to the processor 204, but also to implement the functionality described above with respect to the signal detector 218 and/or the DSP 220. Further, each of the components illustrated in FIG. 2 can be implemented using a plurality of separate elements.

To ensure proper communication between multiple mobile devices, mobile devices can receive information regarding characteristics of the mobile devices. For example, the mobile device 142 (FIG. 1) can receive timing information about a mobile device 114 (FIG. 1) in order to synchronize timing of communication between the mobile device 142 and the mobile device 114. Additionally or alternatively, the mobile device 142 can receive other information such as a medium access control (MAC) address of another mobile device, etc. The mobile device 142 can determine whether it needs such information independently, such as through software that is executed using memory 206 and processor 204.

The mobile device 142 (FIG. 1) can have a plurality of operational modes. For example, the mobile device 142 can have a first operational mode referred to as an active mode, normal operation mode, or full power mode. In the active mode, the mobile device 142 can always be in an "awake" state and actively transmit/receive data with another mobile device. Further, the mobile device 142 can have a second operational mode referred to as a power-save mode or sleep mode. In the power-save mode, the mobile device 142 can be in the "awake" state or can be in a "doze" or "sleep" state where the mobile device 142 does not actively transmit/receive data with another mobile device. For example, the receiver 212 and possibly DSP 220 and signal detector 218 of the mobile device 142 can operate using reduced power consumption in the doze state. Further, in the power-save mode, an mobile device 142 can occasionally enter the awake state to listen to messages from other mobile devices (e.g., paging messages) that indicate to the mobile device whether or not the mobile device needs to "wake up" (e.g., enter the awake state) at a certain time so as to be able to transmit/receive data with another mobile device.

Figure 3:
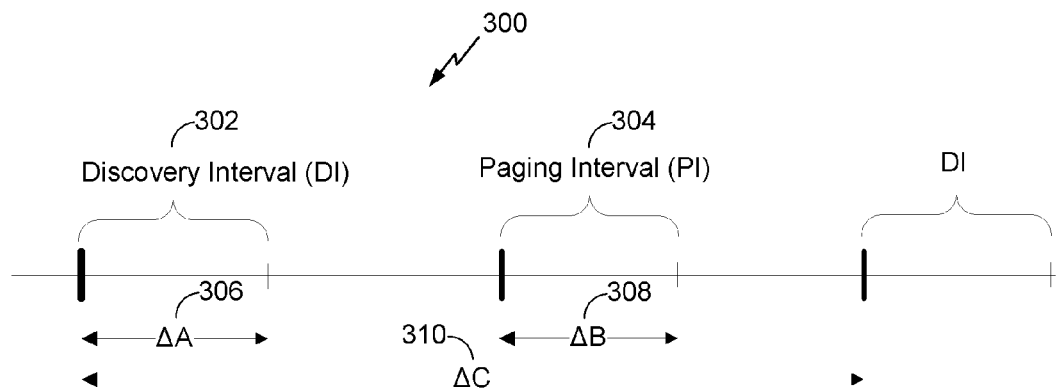
FIG. 3 illustrates an exemplary communication timeline in a wireless communication system in accordance with aspects of the present disclosure.

FIG. 3 illustrates an exemplary communication timeline 300 in a wireless communication system where devices can communicate via one channel. The exemplary communication timeline 300 can include a discovery interval (DI) 302 of a time duration $\Delta A$ 306, a paging interval (PI) 304 of a time duration $\Delta B$ 308, and an overall interval of a time duration $\Delta C$ 310. In some aspects, communications can occur via other channels as well. Time increases horizontally across the page over a time axis.

During the DI 302, mobile devices can advertise services through broadcast messages such as discovery packets. Mobile devices can listen to broadcast messages transmitted by other mobile devices. In some aspects, the duration of DIs can vary over time. In other aspects, the duration of the DI can remain fixed over a period of time.

The end of the DI 302 can be separated from the beginning of the subsequent PI 304 by a first remainder period of time as illustrated in FIG. 3. The end of the PI 304 can be separated from the beginning of a subsequent DI by a different remainder period of time as illustrated in FIG. 3.

During the PI 304, mobile devices can indicate interest in one or more of a plurality of services advertised in a broadcast message by transmitting paging request messages such as paging request packets. Mobile devices can listen to paging request messages transmitted by other mobile devices. In some aspects, the duration of the PI can vary over time. In other aspects, the duration of the PI can remain constant over a period of time. In some aspects, the duration of the PI can be less than the duration of the DI.

The overall interval of duration $\Delta C$ 310 can measure the period of time from the beginning of one DI to the beginning of a subsequent DI as illustrated in FIG. 3. In some aspects, the duration of the overall interval can vary over time. In other aspects, the duration of the overall interval can remain constant over a period of time. At the conclusion of the overall interval of duration $\Delta C$ 310, another overall interval can begin, including a DI, a PI, and the remainder intervals. Consecutive overall intervals can follow indefinitely or continue for a fixed period of time.

A mobile device can enter a sleep or power-save mode when the mobile device is not transmitting or listening or is not expecting to transmit or listen. As an example, the mobile device can sleep during periods other than the DI or PI. The mobile device in the sleep mode or power-save mode can awake or return to normal operation or full power mode at the beginning of the DI or PI to enable transmission or listening by the mobile device. In some aspects, the mobile device can awake or return to normal operation or full power mode at other times when the mobile device expects to communicate with another device, or as a result of receiving a notification packet instructing the mobile device to awake. The mobile device can awake early to ensure that the mobile device receives a transmission.

Figure 4:
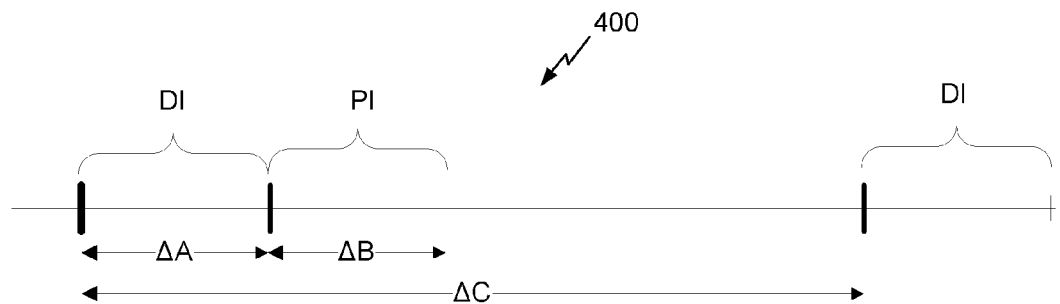
FIG. 4 illustrates an exemplary communication timeline in a wireless communication system in accordance with aspects of the present disclosure.

FIG. 4 illustrates an exemplary communication timeline in a wireless communication system where devices can communicate via one channel. The exemplary communication timeline 400 can include a DI of a time duration $\Delta A$, a PI of a time duration $\Delta B$, and an overall interval of a time duration $\Delta C$. Time increases horizontally across the page over the time axis. As illustrated in FIG. 4, the beginning of a PI can immediately follow the end of a DI. The end of the PI can be separated from the beginning of a subsequent DI by a remainder period of time equal to ΔC less the sum of ΔB and ΔA.

Figure 5:
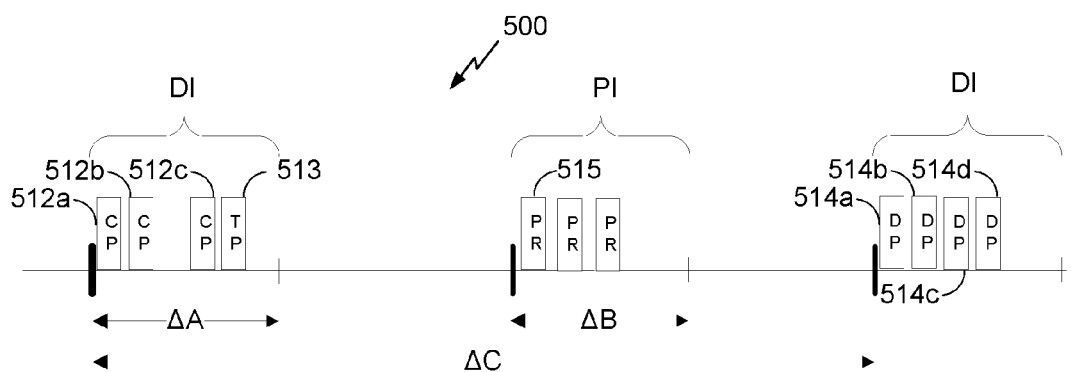
FIG. 5 illustrates an exemplary communication timeline in a wireless communication system in accordance with aspects of the present disclosure.

FIG. 5 illustrates an exemplary communication timeline 500 in a wireless communication system where devices can communicate via one channel. The exemplary communication timeline 500 can include a DI of a time duration ΔA, a PI of a time duration ΔB, and an overall interval of a time duration ΔC. Time increases horizontally across the page over the time axis. During the DI, mobile devices can transmit cluster discovery packets (CPs), discovery packets (DPs), and/or discovery trigger messages (TPs). During the PI, mobile devices can transmit paging request packets (PRs). A DP can be a packet configured to advertise a plurality of services provided by a mobile device and to indicate when the paging interval is for the device that transmits the discovery packet. The DP can include a data frame, management frame, or management action frame. The DP can carry information generated by a higher layer discovery protocol or an application based discovery protocol. The PR can be a packet configured to indicate interest in at least one of the plurality of services provided by a mobile device.

The communication channel can be cleared of devices communicating using legacy protocols during the DI and PI of packets by transmitting special clear to send (S-CTS) frames. An S-CTS frame can instruct devices using legacy protocols to refrain from sending data for a given time. However, the S-CTS can allow devices to send discovery packets and paging request packets.

Mobile devices can contend for use of the channel during the DI and PI to determine which DP or PR can be transmitted at a particular time. In some aspects, the contention method utilized can include carrier sense multiple access (CSMA). CSMA can be a probabilistic Media Access Control (MAC) protocol in which a mobile device verifies the absence of other traffic before transmitting a packet on the shared transmission channel. In other aspects, the contention method utilized can include CSMA with collision avoidance (CSMA/CA). Under the CSMA/CA approach, if the channel can be sensed as busy, transmission can be deferred for an interval. The deferred interval can be random or determined using another scheme such as an interval lookup table. CSMA/CA can be the default 802.11 MAC approach. Utilizing a contention approach can provide the benefit of enabling fixed overhead to scale linearly with the number of devices in the wireless communication system as opposed to scaling based on the number of devices squared. Additionally, a contention approach can be used to determine when devices can transmit packets outside of the DI or PI.

The start and end of the DI and PI can be known via numerous methods to each mobile device desiring to transmit a discovery packet or a paging request packet. For example, one or more mobile devices can advertise the start and end of the DI and/or PI in a cluster discovery message. In some aspects, each mobile device can synchronize its clock with the other mobile devices and set a shared DI and PI start time and DI duration and PI duration. In other aspects, a device can send a signal such as a S-CTS signal to clear the medium of legacy communications, such as communications that can conflict or not be compliant with aspects of the present disclosure, and indicate the beginning and duration of the DI or PI period, as well as additional information about the DI and PI durations. In some cases, a contention approach can be beneficial flexibility, such as when the clocks of communicating devices may not be tightly synchronized.

As shown in FIG. 5, three cluster discovery messages 512a-512c can contend for transmission on the channel during the DI. The three cluster discovery messages 512a-512c can be transmitted by, for example, three different mobile devices. In embodiments where the three discovery packets are transmitted by more than one mobile device, the mobile devices can use a CSMA/CA approach to determine which packet can be transmitted at a particular time. The mobile devices can have synchronized clocks and can have previously communicated a shared DI duration such that each mobile device can be aware of the approximate DI start and end time. In some aspects, each mobile device desiring to transmit a discovery packet can select a random initial transmission time within the DI to attempt to transmit a discovery packet or packets. In other aspects, the mobile device can select a predetermined or scheduled initial transmission time.

Before transmitting, each mobile device can sense the medium for a period of time to determine whether a communication can be currently in progress on the channel. In some aspects, the mobile device can sense the medium for approximately 25 μs. If the medium is clear, the mobile device can transmit a discovery packet such as cluster discovery packet (CP) 512. If the medium is not clear, the mobile device can delay transmitting the discovery packet for a delay period. The delay period can be random in some aspects while calculated or predetermined in other aspects. After the delay period, the mobile device can again sense the medium, and if the medium is clear, the mobile device can transmit the discovery packet. If the medium is not clear, the mobile device can repeat the delay and sense process until the discovery packet can be successfully sent.

In an embodiment, the mobile devices in each cluster 110, 120, and/or 130 (FIG. 1) can contend to transmit a cluster discovery message advertising the respective cluster. For example, the mobile devices 112, 114, 116, and/or 118 (FIG. 1) can contend to transmit the cluster discovery message 512a during the DI. For example, the mobile devices 112, 114, 116, and/or 118 can attempt to transmit the cluster discovery message 512a using a contention approach such as randomized start CSMA. In the illustrated embodiment, the mobile device 112 succeeds in transmitting the cluster discovery message 512a, which can advertise the first mobile device cluster 110. The mobile devices 114, 116, and/or 118 can detect the transmission of the discovery message 512a and can refrain from retransmitting the discovery message 512a.

Similarly, the mobile devices 118, 120, 122, 124, and/or 126 (FIG. 1) can contend to transmit the cluster discovery message 512b during the DI. For example, the mobile devices 118, 120, 122, 124, and/or 126 can attempt to transmit the cluster discovery message 512b using a contention approach such as randomized start CSMA. In the illustrated embodiment, the mobile device 112 succeeds in transmitting the cluster discovery message 512b, which can advertise the second mobile device cluster 120. The mobile devices 114, 116, and/or 118 can detect the transmission of the discovery message 512b and can refrain from retransmitting the discovery message 512b.

Similarly, the mobile devices 130, 132, 134, 136, and/or 138 (FIG. 1) can contend to transmit the cluster discovery message 512c during the DI. For example, the mobile devices 130, 132, 134, 136, and/or 138 can attempt to transmit the cluster discovery message 512c using a contention approach such as randomized start CSMA. In the illustrated embodiment, the mobile device 112 succeeds in transmitting the cluster discovery message 512c, which can advertise the second mobile device cluster 130. The mobile devices 114, 116, and/or 118 can detect the transmission of the discovery message 512c and can refrain from retransmitting the discovery message 512c.

The mobile devices 112, 114, 116, 118, 122, 124, 126, 128, 132, 134, 136, and/or 138 can be configured to remain on for a duration of time after the transmission of a cluster discovery message for a cluster to which the mobile device belongs. In an embodiment, the mobile devices can remain on for a fixed duration. In another embodiment, the mobile devices can remain on until the end of the DI.

In an embodiment, a mobile device such as, for example, the mobile device 142 (FIG. 1) can turn on and remain in a listen state when discovering new devices. Accordingly, the mobile device 142 can receive one or more of the cluster discovery messages 512a-512c. The mobile device 142 can determine the timing of the DI and/or the PI from the one or more cluster discovery messages 512a-512c. In an embodiment, each cluster 110, 120, and 130 can operate according to a different timing. For example, the DIs for each cluster 110, 120, and 130 can be staggered so as not to overlap.

After receipt of a cluster discovery message such as, for example, the cluster discovery message 512a, a new mobile device, such as the mobile device 142 (FIG. 1), can transmit a discovery trigger message 513. Embodiments in which new mobile devices transmit discovery trigger messages can be referred to as "triggered broadcast" embodiments. In a triggered broadcast embodiment, the mobile device 142 can transmit the discovery trigger message 513 using a contention approach such as, for example, CSMA. In an embodiment, the mobile device 142 can transmit the discovery trigger message after the DI, during the PI, during another designated time slot, or at any other time. The discovery trigger message 513 can include an identifier of the sending device (e.g., the mobile device 142) and can trigger other devices (e.g., the mobile devices 112, 114, 116, and 118) to send discovery messages. One or more mobile devices (e.g., the mobile devices 112, 114, 116, and 118) can transmit discovery packets in response to a discovery trigger message 513. The mobile device 142 can enter a sleep or inactive state, for example until the next DI.

In another embodiment, the new mobile device, such as the mobile device 142 (FIG. 1) may not transmit the discovery trigger message 513. Embodiments in which new mobile devices do not transmit discovery trigger messages can be referred to as "continuous broadcast" embodiments. In a continuous broadcast embodiment, the mobile device 142 can determine the timing of the DI and/or the PI from the one or more cluster discovery messages 512a-512c. The mobile device 142 can enter a sleep or inactive state, for example until the next DI. The one or more mobile devices (e.g., the mobile devices 112, 114, 116, and 118) can transmit discovery packets without receiving a discovery trigger message 513. For example, the one or more mobile devices (e.g., the mobile devices 112, 114, 116, and 118) can transmit discovery packets at one or more DIs such as every DI, every n DIs, or during certain DIs according to a pattern. At one or more DIs, the mobile device 142 can wake up and passively discover the other mobile devices by listening to the discovery packets.

In the illustrated embodiment, the discovery trigger message 513 includes a request for discovery packets from mobile devices in the first cluster 110 (FIG. 1). In various embodiments, the discovery trigger message 513 can include requests for discovery packets from additional specific clusters, or all clusters within range. The mobile devices 112, 114, 116, and 118 can receive the discovery trigger message 513. At the next DI, the mobile device 142 can wake up. The mobile devices 112, 114, 116, and 118 can transmit discovery messages 514a-514d, respectively. In an embodiment, the discovery messages 514a-514d can advertise information particular to the mobile devices 112, 114, 116, and 118. In an embodiment, the mobile devices 112, 114, 116, and 118 can transmit the discovery messages 514a-514d using a contention approach such as, for example, CSMA.

In various embodiments, the mobile device 142 can retransmit the discovery trigger message 513 one or more additional times. In an embodiment, the retransmitted discovery trigger message 513 can indicate which discovery messages 514a-514d have been received (for example, by including device identifiers). The mobile devices 112, 114, 116, and 118 can retransmit the discovery messages 514a-514d one or more additional times. For example, the mobile devices 112, 114, 116, and 118 can retransmit a discovery message 514a-514d when they receive a retransmitted discovery trigger message 513 indicating that a discovery messages 514a-514d was not received. In an embodiment, the mobile devices 112, 114, 116, and 118 can retransmit the discovery messages 514a-514d one or more additional times in the absence of a retransmitted discovery trigger message 513.

The process of sending a paging request packet during the PI can similar to the process described above with regards to transmitting a discovery packet during the DI. As an example, FIG. 5 depicts that three paging request packets can contend for transmission on the channel during the PI. The three paging request packets can be transmitted by up to three different mobile devices. If the three discovery packets are transmitted by more than one mobile device, the mobile devices can use a CSMA/CA approach to determine which packets can be transmitted at a particular time. The mobile devices can have synchronized clocks and can have previously communicated a shared PI duration such that each mobile device can be aware of the approximate PI start and end time. In some aspects, each mobile device desiring to transmit a paging request packet can select a random initial transmission time within the PI to attempt to transmit its paging request packet or packets. Before transmitting, each mobile device can sense the medium to determine whether a communication can be currently in progress on the channel. In some aspects, the mobile device can sense the medium for approximately 25 μs. If the medium is clear, the mobile device can transmit a paging request packet such as paging request packet (PR) 515. If the medium is not clear, the mobile device can delay transmitting the paging request packet for a delay period. The delay period can be random in some aspects while calculated or predetermined in other aspects. After the delay period, the mobile device can again sense the medium, and if the medium is clear, the mobile device can transmit the paging request packet. If the medium is not clear, the mobile device can repeat the delay and sense process until the paging request packet can be successfully sent.

Mobile devices potentially interested in services advertised via discovery packets, such as at least one of the plurality of services advertised in DP 512 and/or 514A-514D, can awake or remain awake during the DI and process discovery packets to determine if a particular discovery packet includes information about one or more of a plurality of services that can be of interest to the receiving mobile device. After the DI period, mobile devices not planning to communicate information can enter a sleep or power-save mode for a break period until the next time the mobile devices plan to communicate. In some aspects, a mobile device can enter the sleep or power-save mode until the mobile device can communicate additional information with another device outside of the DI or PI. In some aspects, the mobile device can enter the sleep or power-save mode until the beginning of the next PI. At the beginning of the PI, the interested mobile device can awake to transmit a paging request packet to the provider of the service.

Mobile devices waiting for responses to a transmitted discovery packet, such as the plurality of services advertised in the DP 512 and/or 514A-514D, can awake or remain awake during the PI and process paging request packets, such as the PR 515, to determine if a particular paging request packet indicates interest by another device in at least one of plurality of services provided by the mobile device. After the PI period, mobile devices not planning to communicate information can enter a sleep or power-save mode for a break period until the next time the mobile devices plan to communicate. In some aspects, a mobile device can enter the sleep or power-save mode until the mobile device can communicate additional information with another device outside of the DI or PI. In some aspects, the mobile device can enter the sleep or power-save mode until the beginning of the next DI.

As examples, the duration ΔC of the overall interval can equal approximately one to five seconds in some aspects. In other aspects, the overall interval can be less than one second or more than five seconds. The duration ΔA of the DI can equal approximately 16 ms in some aspects while more or less than 16 ms in other aspects. The duration ΔB of the PI can equal approximately the duration ΔA in some aspects. In other aspects, the duration ΔB can be more or less than the duration ΔA.

FIG. 6 illustrates an exemplary communication timeline 600 in a wireless communication system. The exemplary communication timeline 600 can include a DI of a time duration ΔA, a PI of a time duration ΔB, and an overall interval of a time duration ΔC. Time increases horizontally across the page over the time axis.

As shown in FIG. 6, the DI can include DI slots, such as DI slot 616, and the PI can include PI slots, such as PI slot 618. The DI slots or PI slots can facilitate a scheduled approach to access of the medium during the DI or the PI, respectively. The DI slots can represent periods of time when a particular mobile devices can transmit a discovery packet or a discovery trigger message, or when a mobile device can transmit a registration request packet. For example, a mobile device can be assigned to transmit a discovery packet during DI slot 616. The PI slots can represent periods of time when particular mobile devices can transmit paging request packets. For example, a PI can be assigned to transmit a paging request packet during PI slot 618.

The DI slots and PI slots can be assigned to mobile devices using the device MAC ID based on a hash calculation in some aspects. Random time-varying parameters can be added to the hash function so that two MAC IDs may not repeatedly collide over time. In other aspects, collaborative mechanisms such as sensing the medium and taking an empty slot can be utilized. If a device can sense the medium as busy for a point coordination function interface space (PIFS) time of approximately 25 μs before the start of the slot, the device can abandon or delay transmission of a discovery packet or a paging request packet.

Each mobile device communicating or planning to communicate on the channel can transmit a discovery packet at least once every particular period to notify other devices of the mobile device's presence on the channel Additionally, as discussed in the description of FIG. 5, mobile devices can enter a sleep or power-save mode during certain times such as those intervals discussed in FIG. 5.

FIG. 7 illustrates an exemplary communication timeline 700 in a wireless communication system. The exemplary communication timeline 700 can include a DI of a time duration ΔA, a PI of a time duration ΔB, and an overall interval of a time duration ΔC. Time increases horizontally across the page over the time axis. The DI and PI can be slotted as depicted in FIG. 7.

The beginning of the DI can begin with the transmission of a discovery start frame (DSF) packet 720 by a mobile device. In some aspects, the DSF packet 720 can be a discovery packet with a frame control value indicating that the packet is a DSF packet. The DSF packet 720 can prevent other traffic from communicating on the channel until a subsequent discovery packet (DP) is transmitted on the channel or during the DI. In other aspects, the DSF packet 720 can be a clear to send (CTS) frame. The CTS frame can carry a Social WiFi BSSID in the address field. The duration of the DI can be previously communicated to devices in some aspects while devices can sense the end of the DI based on the absence of communication on the channel for a period of time in other aspects.

The beginning of the PI can begin with the transmission of a paging start frame (PSF) packet 722 by a mobile device. In some aspects, the PSF packet 722 can be a paging request packet with a frame control value indicating that the packet is a PSF packet. The PSF packet 722 can prevent other traffic from communicating on the channel until a subsequent paging request packet (PR) is transmitted on the channel or during the PI. In other aspects, the PSF packet 722 can be a clear to send (CTS) frame. The CTS frame can carry a Social WiFi BSSID in the address field. The start or duration of the PI can be previously communicated to devices in some aspects while devices can sense the start or end of the PI based on the presence or absence of communication on the channel for a period of time in other aspects.

As discussed in the description of FIG. 5, mobile devices can enter a sleep or power-save mode during certain times such as those particular intervals discussed in the description of FIG. 5.

Figure 8:
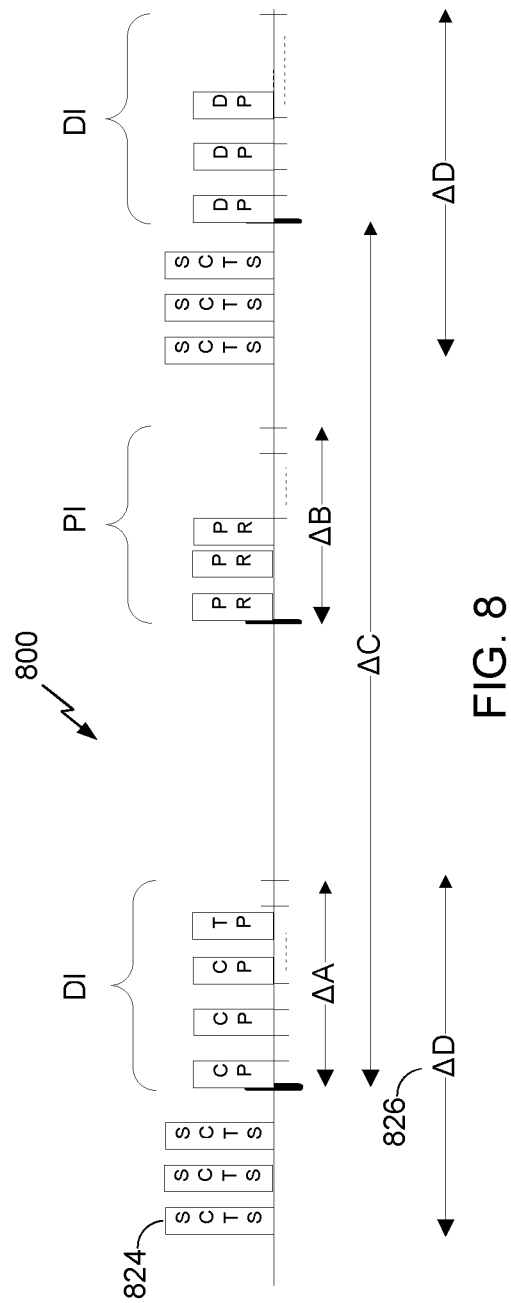
FIG. 8 illustrates an exemplary communication timeline in a wireless communication system in accordance with aspects of the present disclosure.

FIG. 8 illustrates an exemplary communication timeline 800 in a wireless communication system. The exemplary communication timeline 800 can include a DI of a time duration ΔA, a PI of a time duration ΔB, and an overall interval of a time duration ΔC. Time increases horizontally across the page over the time axis. The DI can be slotted while the PI can be unslotted as shown in FIG. 8.

The beginning of the DI can begin with the transmission of one or more S-CTS packets 824 by a mobile device. In some aspects, the S-CTS packet can be a CTS frame with a frame control value indicating that the frame is an S-CTS packet. The S-CTS packet can prevent legacy traffic from communicating on the channel during the DI. The start or duration of the DI can be previously communicated to devices in some aspects while devices can sense the start or end of the DI based on the presence or absence of communication on the channel for a period of time in other aspects. The exemplary timeline can further include a time duration ΔD beginning at the transmission of the first S-CTS and ending at the end of the DI.

The beginning of the PI can begin with the transmission of a PSF packet by a mobile device. In some aspects, the PSF packet can be a paging request packet with a frame control value indicating that the packet is a PSF packet. The PSF packet can prevent other traffic from communicating on the channel until a subsequent paging request packet (PR) is transmitted on the channel or during the PI. In other aspects, the PSF packet can be a clear to send (CTS) frame. The CTS frame can carry a Social WiFi BSSID in the address field. The start or duration of the PI can be previously communicated to devices in some aspects while devices can sense the start or end of the PI based on the presence or absence of communication on the channel for a period of time in other aspects. In yet other aspects, the paging interval can begin with the transmission of one or more S-CTS packets by a device. The paging request packets transmitted during the PI can be sent using a contention approach as discussed in the description of FIG. 5.

Additionally, as discussed in the description of FIG. 5, mobile devices can enter a sleep or power-save mode during certain times such as those particular intervals discussed in the description of FIG. 5.

Figure 9:
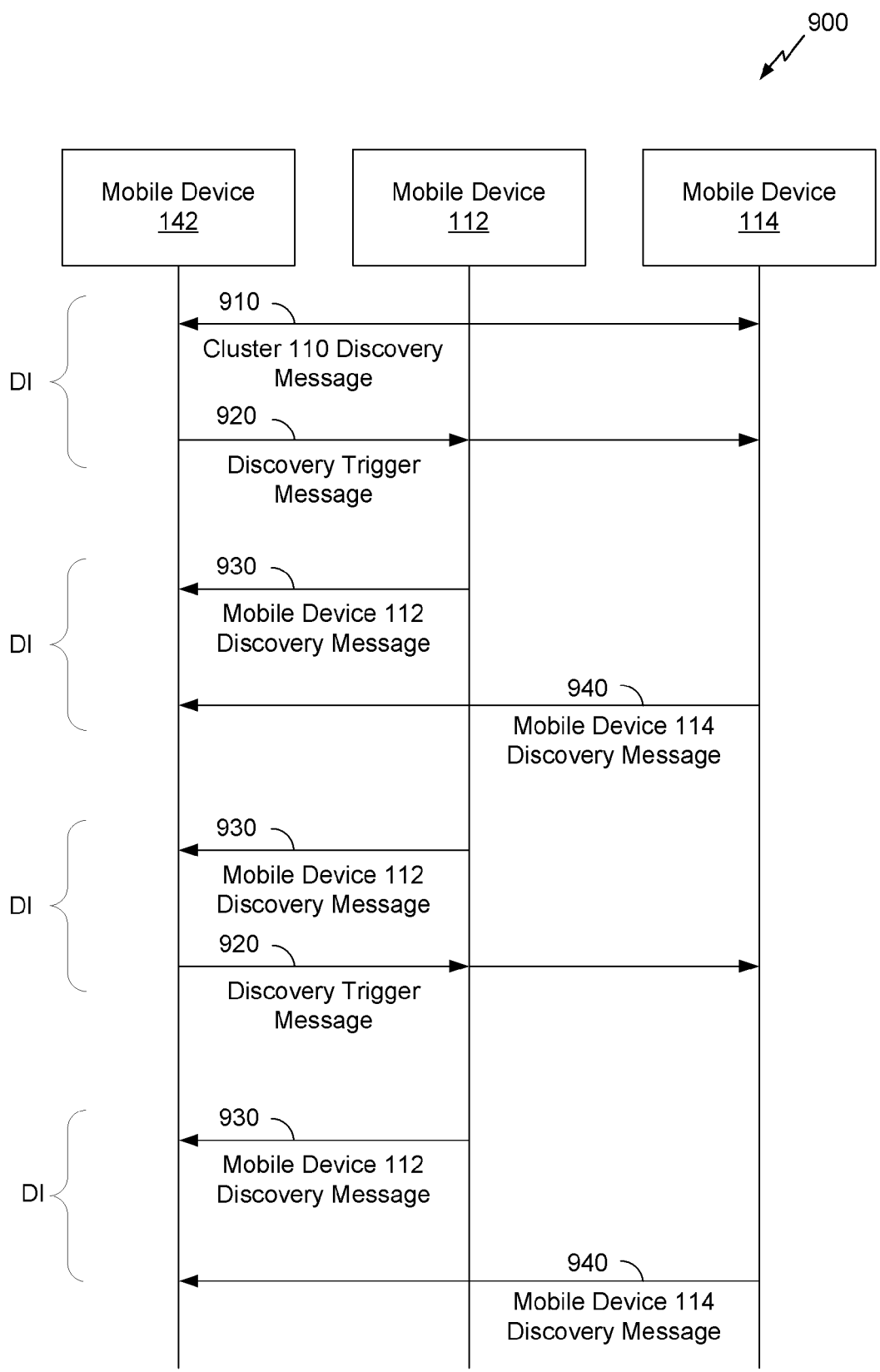
FIG. 9 illustrates an exemplary signal flow diagram illustrating signal flow exchanged among devices illustrated in FIG. 1.

FIG. 9 illustrates an exemplary communication timeline 900 in a wireless communication system. The exemplary communication timeline 900 can include a DI of a time duration ΔA, a PI of a time duration ΔB, and an overall interval of a time duration ΔC. Time increases horizontally across the page over the time axis. The DI and PI can be slotted in some aspects as depicted in FIG. 9. In other aspects, the DI or PI can be unslotted as discussed in the description of FIG. 5, and mobile devices can contend to communicate on the channel.

FIG. 9 illustrates an exemplary signal flow diagram 900 illustrating signal flow exchanged among devices illustrated in FIG. 1. Particularly, the signal flow diagram 900 shows signals exchanged between the mobile device 142, the mobile device 112, and the mobile device 114, according to an embodiment. Although only the mobile devices 142, 112, and 114 are discussed, a person having ordinary skill in the art will appreciate that the signal flow discussed herein can apply to any mobile devices.

As discussed above with respect to FIG. 5, the mobile device 142 can wait in an awake or listening state. Referring still to FIG. 9, during a DI, the mobile device 112 can broadcast a cluster discovery message 910 for the cluster 110, for example, to the mobile devices 142 and 114. In various embodiments, the mobile device 114 can also attempt to transmit the cluster discovery message 910 using a contention mechanism. The mobile device 114 can receive the cluster discovery message 910 from the mobile device 112, and can refrain from transmitting another cluster discovery message 910 for the cluster 110.

The mobile device 142 can receive the cluster discovery message 910. The mobile device 142 can determine a timing of the next DI based on the cluster discovery message 910. The mobile device 142 can broadcast a discovery trigger message 920, for example, to the mobile devices 112 and 114. The mobile device 142 can enter a sleep or inactive state, for example, until the next DI. The mobile devices 112 and 114 can receive the discovery trigger message 920. The mobile devices 112 and 114 can enter a sleep or inactive state, for example, until the next DI.

At the next DI, the mobile device 142 can wake up and listen for discovery packets. The mobile devices 112 and 114 can wake up and transmit discovery messages 930 and 940, respectively. In an embodiment, the mobile device 142 may not receive one or more discovery messages such as, for example, the discovery message 940. In an embodiment, the mobile device 112 can retransmit the discovery message 930 at one or more subsequent DIs.

In an embodiment, the mobile device 142 can retransmit the discovery trigger message 920 at one or more subsequent DIs. The retransmitted discovery trigger message 920 can include an indication of discovery messages received. For example, where the mobile device 142 does not receive the discovery message 940 from the mobile device 114, the retransmitted discovery trigger message 920 can include an identifier of the mobile device 112, from which a discovery message was received. The mobile device 114 can receive the retransmitted discovery trigger message 920, and can determine that its identifier is not included in the message 920. The mobile device 114 can retransmit the discovery message 940 at one or more subsequent DIs. For example, the mobile device 114 can retransmit the discovery message 940 until it receives a discovery trigger message 920 including an identifier of the mobile device 114, or until a retransmit limit is reached.

Figure 10:
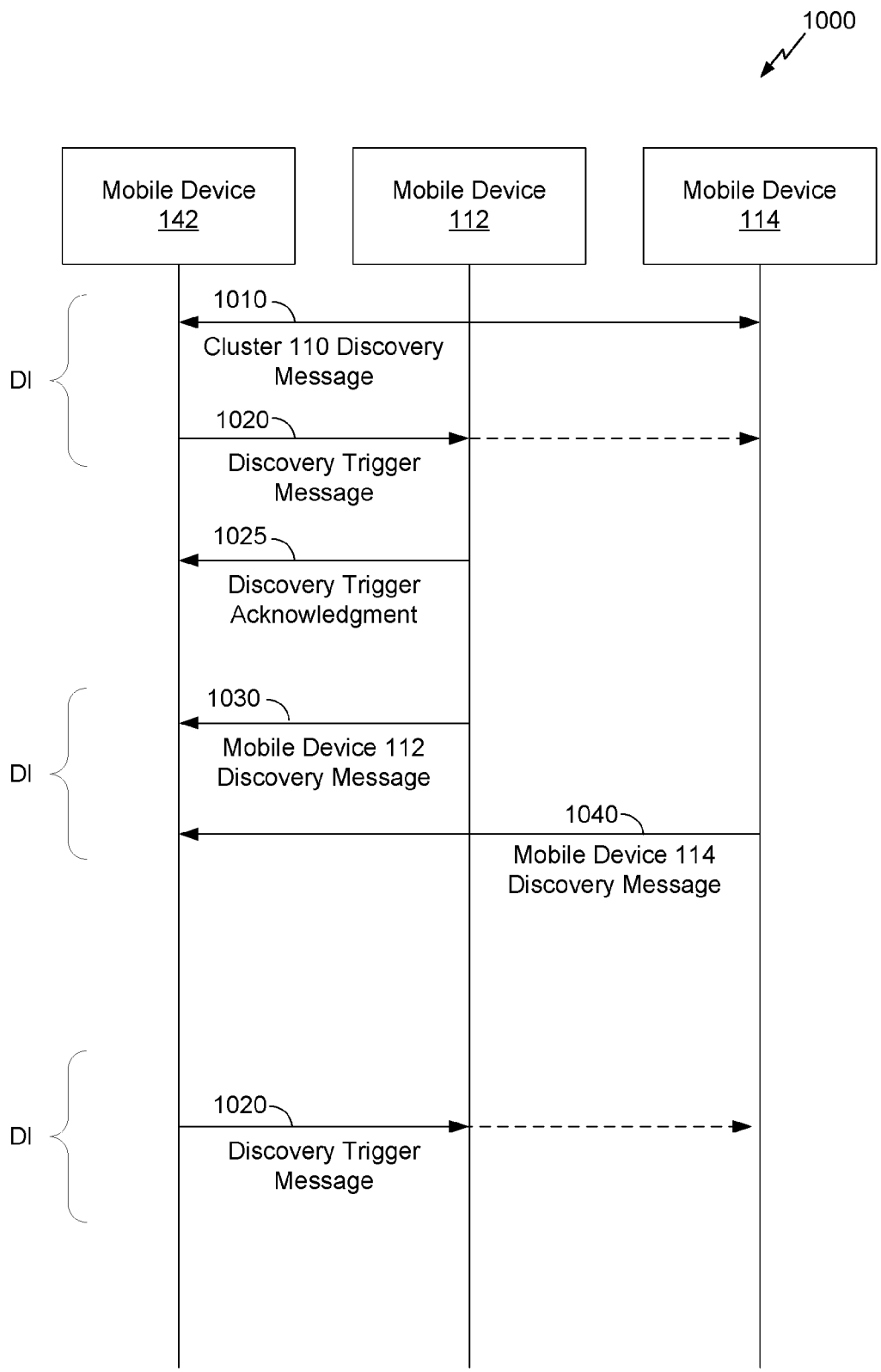
FIG. 10 illustrates another exemplary signal flow diagram illustrating signal flow exchanged among devices illustrated in FIG. 1.

FIG. 10 illustrates another exemplary signal flow diagram 1000 illustrating signal flow exchanged among devices illustrated in FIG. 1. Particularly, the signal flow diagram 1000 shows signals exchanged between the mobile device 142, the mobile device 112, and the mobile device 114, according to an embodiment. Although only the mobile devices 142, 112, and 114 are discussed, a person having ordinary skill in the art will appreciate that the signal flow discussed herein can apply to any mobile devices.

As discussed above with respect to FIG. 5, the mobile device 142 can wait in an awake or listening state. Referring still to FIG. 10, during a DI, the mobile device 112 can broadcast a cluster discovery message 1010 for the cluster 110, for example, to the mobile devices 142 and 114. In various embodiments, the mobile device 114 can also attempt to transmit the cluster discovery message 1010 using a contention mechanism. The mobile device 114 can receive the cluster discovery message 1010 from the mobile device 112, and can refrain from transmitting another cluster discovery message 1010 for the cluster 110.

The mobile device 142 can receive the cluster discovery message 1010. The mobile device 142 can determine a timing of the next DI based on the cluster discovery message 1010. The mobile device 142 can unicast a discovery trigger message 1020 to a single mobile device, for example, to the mobile device 112. In an embodiment, the mobile device 142 can unicast the discovery trigger message 1020 to the mobile device from which it received the cluster discovery message 1010. In an embodiment, the mobile device 142 can unicast the discovery trigger message 1020 to a mobile device from which it did not receive the cluster discovery message 1010.

The mobile device 112 can receive the discovery trigger message 1020, and can transmit a discovery trigger acknowledgement 1025 in response. In an embodiment, mobile devices, such as the mobile device 114, can be configured to snoop unicast transmissions. Accordingly, the mobile device 114 may also receive the discovery trigger message 1020. The mobile device 142 can enter a sleep or inactive state, for example, until the next DI. The mobile devices 112 and 114 can enter a sleep or inactive state, for example, until the next DI.

At the next DI, the mobile device 142 can wake up and listen for discovery packets. The mobile devices 112 and 114 can wake up and transmit discovery messages 1030 and 1040, respectively. In an embodiment, the mobile device 142 may not receive one or more discovery messages such as, for example, the discovery message 1040. In an embodiment, the mobile device 112 can retransmit the discovery message 1030 at one or more subsequent DIs.

In an embodiment, the mobile device 142 can retransmit the discovery trigger message 1020 at one or more subsequent DIs. For example, the mobile device 142 can retransmit the discovery trigger message 1020 when it does not receive an acknowledgment. The retransmitted discovery trigger message 1020 can include an indication of discovery messages received. For example, where the mobile device 142 does not receive the discovery message 1040 from the mobile device 114, the retransmitted discovery trigger message 1020 can include an identifier of the mobile device 112, from which a discovery message was received. The mobile device 114 can receive the retransmitted discovery trigger message 1020, and can determine that its identifier is not included in the message 1020. The mobile device 114 can retransmit the discovery message 1040 at one or more subsequent DIs. For example, the mobile device 114 can retransmit the discovery message 1040 until it receives a discovery trigger message 1020 including an identifier of the mobile device 114, or until a retransmit limit is reached.

Figure 11:
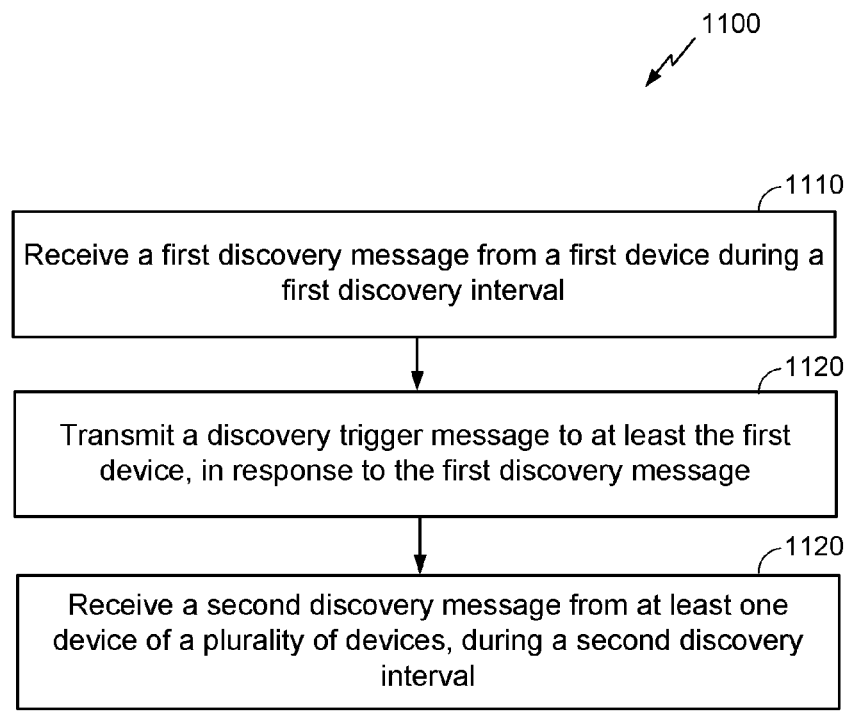
FIG. 11 is a flowchart of an example of a method of discovering devices in a wireless communication system.

FIG. 11 is a flowchart 1100 of an example of a method of discovering devices in a wireless communication system. Although the method of flowchart 1100 is described herein with reference to the wireless communication system 100 discussed above with respect to FIG. 1, the wireless device 202 discussed above with respect to FIG. 2, and the messages 512a-512c, 513, and 514a-514c discussed above with respect to FIG. 5, a person having ordinary skill in the art will appreciate that the method of flowchart 1100 may be implemented by another device described herein, or any other suitable device. In an embodiment, the steps in the flowchart 1100 may be performed by a processor or controller such as, for example, the processor 204, in conjunction with a memory 206. Although the method of flowchart 1100 is described herein with reference to a particular order, in various embodiments, blocks herein may be performed in a different order, or omitted, and additional blocks may be added.

First, at block 1110, a wireless device receives a first discovery message from a first device during a first discovery interval. The first discovery message can include information associated with a device cluster. The device cluster can include a plurality of devices. For example, the receiver 212 of the mobile device 142 can receive the cluster packet 512a, including information associated with the first cluster 110, from the mobile device 116. In an embodiment, the first discovery message can indicate the paging interval start time.

Next, at block 1120, the wireless device transmits a discovery trigger message to at least the first device, in response to the first discovery message. For example, the transmitter 210 of the mobile device 142 can transmit the discovery trigger message 513 in response to the cluster discovery message 512a. In an embodiment, discovery trigger message is configured to request discovery packets associated with the device cluster. For example, the discovery trigger message 513 can request one or more discovery packets 514a-514d.

In an embodiment, the discovery trigger message includes a broadcast frame. In another embodiment, discovery trigger message includes a unicast frame addressed to the first device. For example, the mobile device 142 can transmit the discovery trigger message 513 to the mobile device 116. In an embodiment, the wireless device can receive an acknowledgement to the discovery trigger message. For example, the mobile device 142 can receive the acknowledgement 1025 (FIG. 10) from the mobile device 116.

In an embodiment, transmitting the discovery trigger message occurs at a transmission time based on contention for a medium. In an embodiment, transmitting the discovery trigger message occurs at a transmission time based on contention for a medium beginning at a random start time. In an embodiment, transmitting the discovery trigger message occurs at a transmission time based on contention for a medium beginning at a start time during a first duration of the discovery interval.

Then, at block 1130, the wireless device receives a second discovery message from at least one device of the plurality of devices, during a second discovery interval. The second discovery message is configured to advertise a plurality of services provided by the at least one device of the plurality of devices. For example, the mobile device 142 can receive the discovery packet 514b from the mobile device 116, via the receiver 212.

In an embodiment, the wireless device can determine a wake-up time based on the first discovery message. The wireless device can enter a sleep or power-save mode after transmitting the discovery trigger message. The wireless device can wake up at the determined wake-up time. For example, the processor 204 can determine a wake-up time based on the cluster discovery message 512a, and can wake up the mobile device 142 at the next DI.

Figure 15:
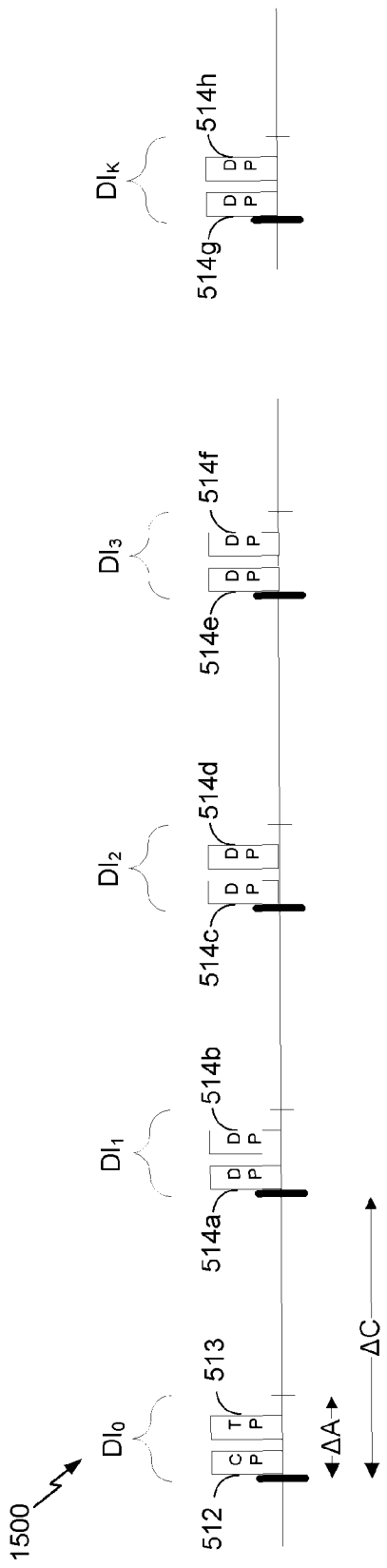
FIG. 15 illustrates an exemplary communication timeline in a wireless communication system where devices spread transmission of discovery packets over a plurality of transmission intervals.

In an embodiment, the second discovery interval is selected from K discovery intervals over which discovery messages are spread. For example, the mobile device 116 can select a random or pseudorandom number n and transmit the discovery packet 514b during $DI_n$ (FIG. 15). In an embodiment, K is chosen such that the number of devices expected to transmit during the second discovery interval is less than a capacity of the second discovery interval with at least a first probability. For example, the mobile device 116 can choose K based on Equation 1, above.

Figure 12:
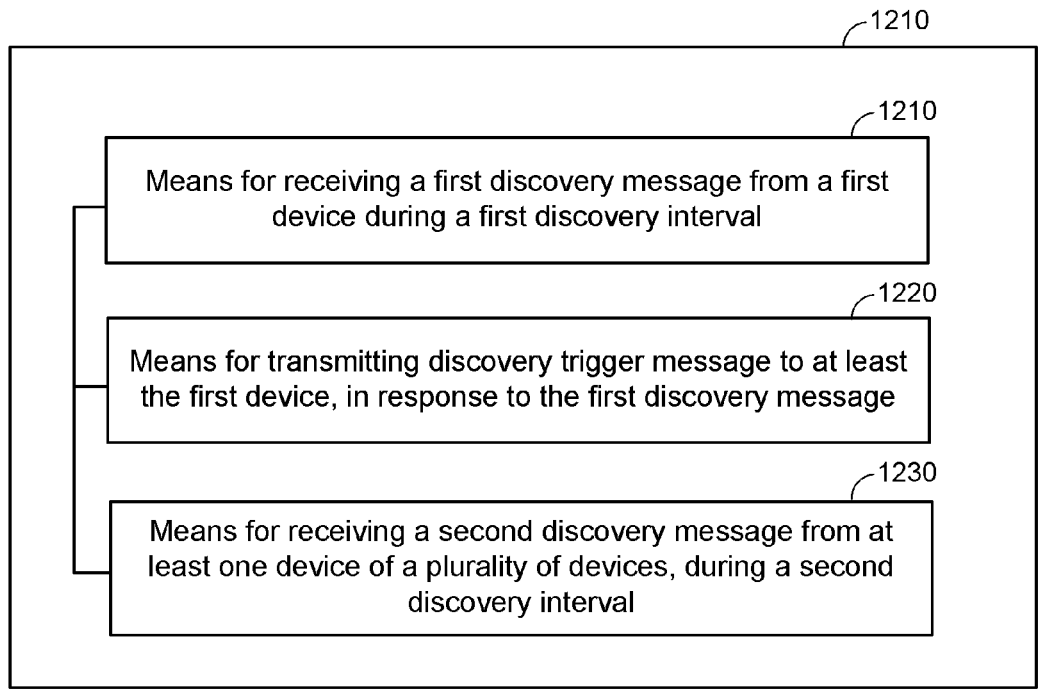
FIG. 12 is a functional block diagram of an apparatus for wireless communication, in accordance with an embodiment of the invention.

FIG. 12 is a functional block diagram of an apparatus for wireless communication 1200, in accordance with an embodiment of the invention. Those skilled in the art will appreciate that an apparatus for wireless communication may have more components than the simplified apparatus 1200 shown in FIG. 12. The apparatus for wireless communication 1200 shown includes only those components useful for describing some prominent features of implementations within the scope of the claims. The apparatus for wireless communication 1200 includes means 1210 for receiving a first discovery message from a first device during a first discovery interval, means 1220 for transmitting a discovery trigger message to at least the first device, in response to the first discovery message, and means 1230 for receiving a second discovery message from at least one device of the plurality of devices, during a second discovery interval.

In an embodiment, the means 1210 for receiving a first discovery message from a first device during a first discovery interval can be configured to perform one or more of the functions described above with respect to block 1110 (FIG. 11). In various embodiments, the means 1210 for receiving a first discovery message from a first device during a first discovery interval can be implemented by one or more of the receiver 212, the antenna 216, and the signal detector 218.

In an embodiment, the means 1220 for transmitting a discovery trigger message to at least the first device, in response to the first discovery message can be configured to perform one or more of the functions described above with respect to block 1120 (FIG. 11). In various embodiments, the means 1220 for transmitting a discovery trigger message to at least the first device, in response to the first discovery message can be implemented by one or more of the transmitter 210, the antenna 216, the processor 204, and the memory 206.

In an embodiment, the means 1230 for receiving a second discovery message from at least one device of the plurality of devices, during a second discovery interval can be configured to perform one or more of the functions described above with respect to block 1130 (FIG. 11). In various embodiments, the means 1230 for receiving a second discovery message from at least one device of the plurality of devices, during a second discovery interval can be implemented by one or more of the receiver 212, the antenna 216, and the signal detector 218.

Figure 13:
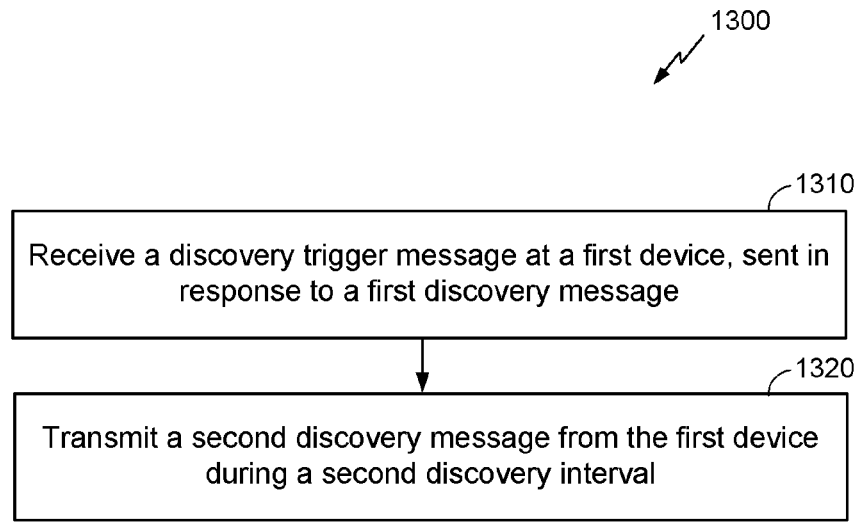
FIG. 13 is a flowchart of another example of a method of discovering devices in a wireless communication system.

FIG. 13 is a flowchart 1300 of another example of a method of discovering devices in a wireless communication system. Although the method of flowchart 1300 is described herein with reference to the wireless communication system 100 discussed above with respect to FIG. 1, the wireless device 202 discussed above with respect to FIG. 2, and the messages 512a-512c, 513, and 514a-514c discussed above with respect to FIG. 5, a person having ordinary skill in the art will appreciate that the method of flowchart 1300 may be implemented by another device described herein, or any other suitable device. In an embodiment, the steps in the flowchart 1300 may be performed by a processor or controller such as, for example, the processor 204, in conjunction with a memory 206. Although the method of flowchart 1300 is described herein with reference to a particular order, in various embodiments, blocks herein may be performed in a different order, or omitted, and additional blocks may be added.

First, at block 1310, a first device receives a discovery trigger message, sent in response to a first discovery message. The first discovery message can include information associated with a device cluster. The device cluster can include a plurality of devices. For example, the receiver 212 of the mobile device 116 can receive the discovery trigger message 513, which the mobile device 142 sends in response to the cluster discovery message 512a. In an embodiment, discovery trigger message is configured to request discovery packets associated with the device cluster. For example, the discovery trigger message 513 can request one or more discovery packets 514a-514d.

In an embodiment, the discovery trigger message includes a broadcast frame. In another embodiment, discovery trigger message includes a unicast frame addressed to the first device. For example, the mobile device 142 can transmit the discovery trigger message 513 to the mobile device 116. The first device 112 can be configured to snoop the discovery trigger message 516. In an embodiment, the first device can transmit an acknowledgement to the discovery trigger message. For example, the mobile device 116 can transmit the acknowledgement 1025 (FIG. 10) to the mobile device 142.

In an embodiment, transmitting the discovery trigger message occurs at a transmission time based on contention for a medium. In an embodiment, transmitting the discovery trigger message occurs at a transmission time based on contention for a medium beginning at a random start time. In an embodiment, transmitting the discovery trigger message occurs at a transmission time based on contention for a medium beginning at a start time during a first duration of the discovery interval.

Then, at block 1330, the first device transmits a second discovery message during a second discovery interval. The second discovery message is configured to advertise a plurality of services provided by the at least one device of the plurality of devices. For example, the mobile device 116 can transmit the discovery packet 514b to the mobile device 142, via the transmitter 210.

In an embodiment, the first device transmits the first discovery message. For example, the transmitter 210 of the mobile device 116 can transmit the cluster packet 512a, including information associated with the first cluster 110, to the mobile device 142. In an embodiment, the first discovery message can indicate the paging interval start time. In certain embodiments, the first discovery message is transmitted periodically.

In an embodiment, the second discovery interval is selected from K discovery intervals over which discovery messages are spread. For example, the mobile device 116 can select a random or pseudorandom number n and transmit the discovery packet 514b during DI$_n$ (FIG. 15). In an embodiment, K is chosen such that the number of devices expected to transmit during the second discovery interval is less than a capacity of the second discovery interval with at least a first probability. For example, the mobile device 116 can choose K based on Equation 1, above.

Figure 14:
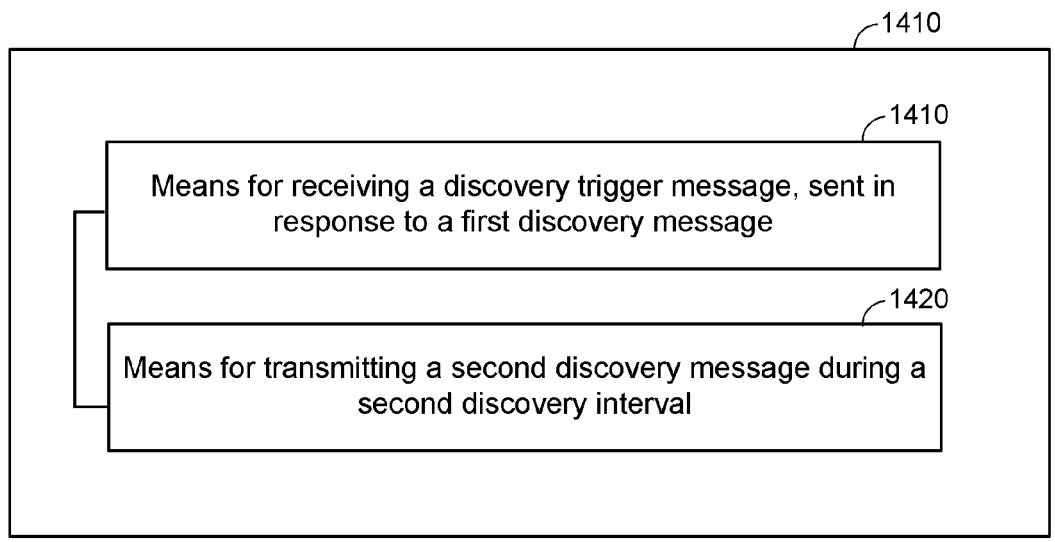
FIG. 14 is a functional block diagram of an apparatus for wireless communication, in accordance with an embodiment of the invention.

FIG. 14 is a functional block diagram of an apparatus for wireless communication 1400, in accordance with an embodiment of the invention. Those skilled in the art will appreciate that an apparatus for wireless communication may have more components than the simplified apparatus 1400 shown in FIG. 14. The apparatus for wireless communication 1400 shown includes only those components useful for describing some prominent features of implementations within the scope of the claims. The apparatus for wireless communication 1400 includes means 1410 for receiving a discovery trigger message, sent in response to a first discovery message, and means 1420 for transmitting a second discovery message during a second discovery interval.

In an embodiment, the means 1410 for receiving a discovery trigger message, sent in response to a first discovery message can be configured to perform one or more of the functions described above with respect to block 1310 (FIG. 13). In various embodiments, the means 1410 for receiving a discovery trigger message, sent in response to a first discovery message can be implemented by one or more of the receiver 212, the antenna 216, and the signal detector 218.

In an embodiment, the means 1420 for transmitting a second discovery message during a second discovery interval can be configured to perform one or more of the functions described above with respect to block 1320 (FIG. 13). In various embodiments, the means 1420 for transmitting a second discovery message during a second discovery interval can be implemented by one or more of the transmitter 210, the antenna 216, the processor 204, and the memory 206.

As discussed above with respect to FIG. 5, mobile devices can contend to transmit discovery packets 514 during discovery intervals, for example, using designated time slots, CSMA, or a combination of techniques described herein. In some embodiments, DIs can be sized based on the number of mobile devices in a cluster, and the size of the discovery packets 514. For example, in an embodiment with 50 mobile devices in a cluster and a 100 byte discovery packet in a 6 Mbps network, the DI can be around 16.5 ms long. In an embodiment, the length of the DIs can be chosen so as to keep the chances of collision under around 10%.

In some embodiments, the number of mobile devices in the cluster may be so large that an appropriately sized DI would be of an unwieldy duration, for example increasing system latency by an unacceptable amount. Accordingly, mobile devices can be configured to transmit discovery packets 514 only during designated DIs. In various embodiments, the mobile devices can choose one or more DIs during which to transmit the discovery packets 415, or the DIs can be assigned. The mobile devices can therefore spread transmission of discovery packets 514 over a plurality of DIs.

FIG. 15 illustrates an exemplary communication timeline 1500 in a wireless communication system where devices spread transmission of discovery packets over a plurality of transmission intervals. The exemplary communication timeline 1500 can include a DI of a time duration ΔA and an overall interval of a time duration ΔC. In some embodiments, the timeline 1500 can also include a PI of a time duration ΔB (not shown) as described above with respect to FIG. 5. Time increases horizontally across the page over the time axis.

During the DI, mobile devices can transmit cluster discovery packets (CPs), discovery packets (DPs), and/or discovery trigger messages (TPs). A DP can be a packet configured to advertise a plurality of services provided by a mobile device and to indicate when the paging interval is for the device that transmits the discovery packet. The DP can include a data frame, management frame, or management action frame. The DP can carry information generated by a higher layer discovery protocol or an application based discovery protocol. The DIs, CPs, DPs, and TPs can be implemented as described in greater detail above, for example with respect to FIG. 5.

As shown in FIG. 15, a mobile device, such as the mobile device 122 (FIG. 1), can transmit the cluster discovery message 512. In an embodiment, the mobile device can use a CSMA/CA approach to determine which packet can be transmitted at a particular time. A new mobile device such as, for example, the mobile device 142 (FIG. 1) can turn on and remain in a listen state when discovering new devices. Accordingly, the mobile device 142 can receive the cluster discovery messages 512. The mobile device 142 can determine the timing of the DIs from the cluster discovery message 512.

After receipt of a cluster discovery message such as, for example, the cluster discovery message 512, a new mobile device, such as the mobile device 142 (FIG. 1), can transmit the discovery trigger message 513. In an embodiment, the mobile device 142 can transmit the discovery trigger message after the DI, during the PI, during another designated time slot, or at any other time. The discovery trigger message 513 can include an identifier of the sending device (e.g., the mobile device 142) and can trigger other devices (e.g., the mobile devices 112, 114, 116, and 118) to send discovery messages.

When the one or more mobile devices (e.g., the mobile devices 112, 114, 116, and 118) receive the discovery trigger message 513, they can determine one or more DIs during which to transmit a discovery packet 514a-514h. For example, the mobile devices can determine a number n between 1 and K, where K is a number of DIs over which to spread the discovery packets 514a-514h. In an embodiment, the mobile devices can select n at random (or pseudo-random). In another embodiment, the mobile devices can select n based on an identifier of the mobile devices such as, for example, based on a hash of a mobile device ID. In some embodiments, the mobile devices can select n based on a pre-programmed DI number. For example, n can be the pre-programmed number modulus K.

In various embodiments, K can be pre-programmed or dynamically determined. In embodiments where the mobile devices dynamically determine K, there may be a pre-programmed minimum value. K can be chosen large enough that the number of mobile devices that respond to the discovery trigger message 513 is less than the number of devices for which the DI is sized. For example, K can be chosen to satisfy Equation 1 below, where erfc is the Gauss error function, N is the number of devices seen in the network (or another approximation for the number of devices that will respond to the discovery trigger frame 513), M is the number of devices for which the DI is sized, and P is a target probability that the number of devices expected to transmit discovery packets during a single DI is less than M (e.g., about 0.1).

$$\mathrm{erfc}\left(\frac{M-N/K}{\sqrt{2\cdot N\left(\frac{1}{K}\right)\left(1-\frac{1}{K}\right)}}\right) < P \quad (1)$$

After determining n, the one or more mobile devices (e.g., the mobile devices 112, 114, 116, and 118) can transmit discovery packets at the determined $DI_n$. For example, the mobile device 112 and 114 can determine an n=1. Accordingly, they can transmit the discovery packets 514a and 514b during the $DI_1$. The mobile devices 112 and 114 can contend to transmit the discovery packets 514a and 514b using any of the time slots and/or CSMA techniques described herein. Similarly, the mobile devices 116 and 118 can determine an n=2 and transmit the discovery packets 514c and 514d during the $DI_2$, and so forth.

In some embodiments, the mobile devices can recalculate or determine K and/or n each time they receive a discovery trigger packet 513. In other embodiments, the mobile devices can recalculate or determine K and/or n only when idle. In some embodiments, as the number of devices N changes, the mobile devices can update K (for example, periodically, intermittently, etc.).

As discussed above with respect to FIG. 5, in some embodiments, the new mobile device, such as the mobile device 142 (FIG. 1) may not transmit the discovery trigger message 513. In such "continuous broadcast" embodiments, the one or more mobile devices (e.g., the mobile devices 112, 114, 116, and 118) can transmit discovery packets without receiving a discovery trigger message 513. In an embodiment, the one or more mobile devices (e.g., the mobile devices 112, 114, 116, and 118) can transmit discovery packets at one or more DIs based on n and K, as discussed above with respect to FIG. 15.

Figure 16:
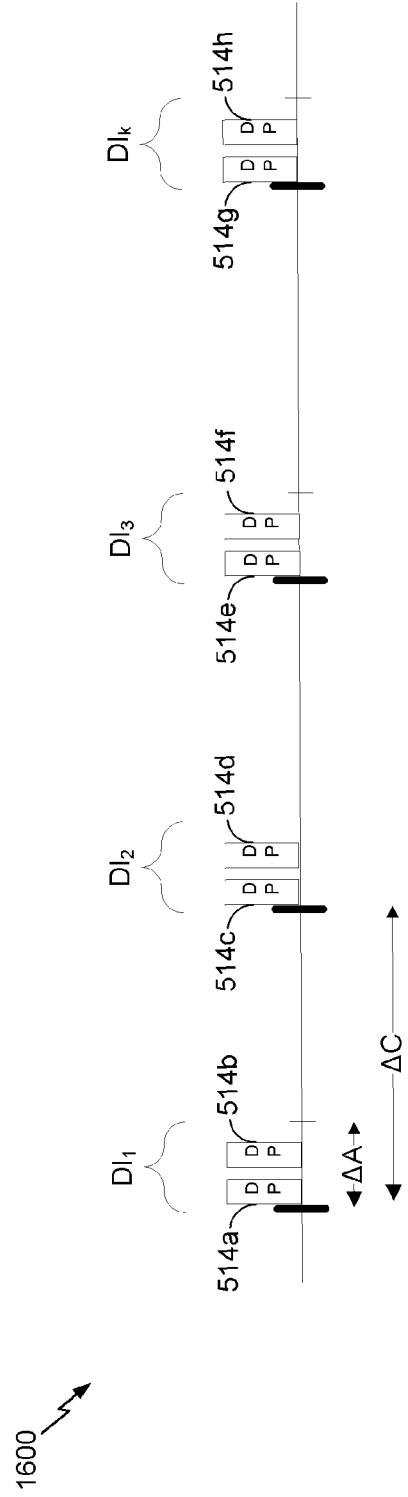
FIG. 16 illustrates another exemplary communication timeline in a wireless communication system where devices spread transmission of discovery packets over a plurality of transmission intervals.

FIG. 16 illustrates another exemplary communication timeline 1500 in a wireless communication system where devices spread transmission of discovery packets over a plurality of transmission intervals. The exemplary communication timeline 1600 can include a DI of a time duration ΔA and an overall interval of a time duration ΔC. In some embodiments, the timeline 1500 can also include a PI of a time duration ΔB (not shown) as described above with respect to FIG. 5. Time increases horizontally across the page over the time axis.

During the DI, mobile devices can transmit cluster discovery packets (CPs), discovery packets (DPs), and/or discovery trigger messages (TPs). A DP can be a packet configured to advertise a plurality of services provided by a mobile device and to indicate when the paging interval is for the device that transmits the discovery packet. The DP can include a data frame, management frame, or management action frame. The DP can carry information generated by a higher layer discovery protocol or an application based discovery protocol. The DIs, CPs, DPs, and TPs can be implemented as described in greater detail above, for example with respect to FIG. 5.

As shown in FIG. 16, one or more mobile devices (e.g., the mobile devices 112, 114, 116, and 118) can determine one or more DIs during which to transmit a discovery packet 514a-514h. For example, the mobile devices can determine a number n between 1 and K, where K is a number of DIs over which to spread the discovery packets 514a-514h. In an embodiment, the mobile devices can select n at random (or pseudo-random). In another embodiment, the mobile devices can select n based on an identifier of the mobile devices such as, for example, based on a hash of a mobile device ID. In some embodiments, the mobile devices can select n based on a pre-programmed DI number. For example, n can be the pre-programmed number modulus K.

In various embodiments, K can be pre-programmed or dynamically determined. In embodiments where the mobile devices dynamically determine K, there may be a pre-programmed minimum value. K can be chosen large enough that the number of mobile devices that respond to the discovery trigger message 513 is less than the number of devices for which the DI is sized. For example, K can be chosen to satisfy Equation 1 above.

After determining n, the one or more mobile devices (e.g., the mobile devices 112, 114, 116, and 118) can transmit discovery packets at the determined $DI_n$. For example, the mobile device 112 and 114 can determine an n=1. Accordingly, they can transmit the discovery packets 514a and 514b during the $DI_1$. The mobile devices 112 and 114 can contend to transmit the discovery packets 514a and 514b using any of the time slots and/or CSMA techniques described herein. Similarly, the mobile devices 116 and 118 can determine an n=2 and transmit the discovery packets 514c and 514d during the $DI_2$, and so forth.

In some embodiments, the mobile devices can recalculate or determine K and/or n each time they receive a discovery trigger packet 513. In other embodiments, the mobile devices can recalculate or determine K and/or n only when idle. In some embodiments, as the number of devices N changes, the mobile devices can update K (for example, periodically, intermittently, etc.).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may include non-transitory computer readable medium (e.g., tangible media). In addition, in some aspects computer readable medium may include transitory computer readable medium (e.g., a signal). Combinations of the above should also be included within the scope of computer-readable media.

The methods disclosed herein include one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers.

Thus, certain aspects may include a computer program product for performing the operations presented herein. For example, such a computer program product may include a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of discovering devices in a wireless communication system, the method comprising:
   receiving, at a wireless device, a first discovery message from a first device of a device cluster comprising a plurality of devices during a first discovery interval, the first discovery message comprising information associated with the device cluster;
   transmitting, from the wireless device, a discovery trigger message in response to receiving the first discovery message, wherein the discovery trigger message is transmitted to trigger at least one device of the device cluster to transmit one or more discovery messages, wherein said transmitting occurs at a transmission time based on contention for a medium; and
   receiving, at the wireless device, a second discovery message from at least one device of the device cluster during a second discovery interval, the second discovery message configured to advertise a plurality of services provided by the at least one device of the device cluster in response to the discovery trigger message.

2. The method of claim 1, wherein the first discovery message is received periodically from the first device.

3. The method of claim 1, wherein the second discovery interval is selected from a number (K) of discovery intervals over which discovery messages are spread.

4. The method of claim 3, wherein the number (K) is chosen such that the number of devices expected to transmit during the second discovery interval is less than a capacity of the second discovery interval with at least a first probability.

5. The method of claim 1, further comprising:
   determining a wake-up time based on the first discovery message;
   entering a sleep or power-save mode after transmitting the discovery trigger message; and
   waking up at the determined wake-up time.

6. The method of claim 1, wherein the first discovery message is further configured to indicate the paging interval start time.

7. The method of claim 1, wherein the discovery trigger message is configured to request discovery packets associated with the device cluster.

8. The method of claim 1, wherein the discovery trigger message comprises a broadcast frame.

9. The method of claim 1, wherein the discovery trigger message comprises a unicast frame addressed to the first device.

10. The method of claim 1, wherein said transmitting the discovery trigger message occurs at a transmission time based on contention for a medium beginning at a random start time.

11. The method of claim 1, wherein said transmitting the discovery trigger message occurs at a transmission time based on contention for a medium beginning at a start time during a duration of the first discovery interval.

12. A wireless device configured to discover devices in a wireless communication system, the wireless device comprising:
    a receiver configured to receive a first discovery message from a first device of a device cluster comprising a plurality of devices during a first discovery interval, the first discovery message comprising information associated with the device cluster; and
    a transmitter configured to transmit a discovery trigger message in response to receiving the first discovery message, wherein the discovery trigger message is transmitted to trigger at least one device of the device cluster to transmit one or more discovery messages, wherein the transmitter is configured to transmit the discovery trigger message at a transmission time based on contention for a medium,
    wherein the receiver is further configured to receive a second discovery message from at least one device of the device cluster during a second discovery interval, the second discovery message configured to advertise a plurality of services provided by the at least one device of the device cluster in response to the discovery trigger message.

13. The wireless device of claim 12, wherein the first discovery message is received periodically.

14. The wireless device of claim 12, wherein the second discovery interval is selected from a number (K) of discovery intervals over which discovery messages are spread.

15. The wireless device of claim 14, wherein the number (K) is chosen such that the number of devices expected to transmit during the second discovery interval is less than a capacity of the second discovery interval with at least a first probability.

16. The wireless device of claim 12, further comprising a processor configured to:
   determine a wake-up time based on the first discovery message
   cause the wireless device to enter a sleep or power-save mode after transmitting the discovery trigger message; and
   cause the wireless device to wake up at the determined wake-up time.

17. The wireless device of claim 12, wherein the first discovery message is further configured to indicate the paging interval start time.

18. The wireless device of claim 12, wherein the discovery trigger message is configured to request discovery packets associated with the device cluster.

19. The wireless device of claim 12, wherein the discovery trigger message comprises a broadcast frame.

20. The wireless device of claim 12, wherein the discovery trigger message comprises a unicast frame addressed to the first device.

21. The wireless device of claim 12, wherein the transmitter is configured to transmit the discovery trigger message at a transmission time based on contention for a medium beginning at a random start time.

22. The wireless device of claim 12, wherein the transmitter is configured to transmit the discovery trigger message at a transmission time based on contention for a medium beginning at a start time during a duration of the first discovery interval.

23. An apparatus for discovering devices in a wireless communication system, the apparatus comprising:
   means for receiving a first discovery message from a first device of a device cluster comprising a plurality of devices during a first discovery interval, the first discovery message comprising information associated with the device cluster;
   means for transmitting a discovery trigger message in response to receiving the first discovery message, wherein the discovery trigger message is transmitted to trigger at least one device of the device cluster to transmit one or more discovery messages, wherein transmitting the discovery trigger message occurs at a transmission time based on contention for a medium; and
   means for receiving a second discovery message from at least one device of the device cluster during a second discovery interval, the second discovery message configured to advertise a plurality of services provided by the at least one device of the device cluster in response to the discovery trigger message.

24. The apparatus of claim 23, wherein the first discovery message is received periodically.

25. The apparatus of claim 23, wherein the second discovery interval is selected from a number (K) of discovery intervals over which discovery messages are spread.

26. The apparatus of claim 25, wherein the number (K) is chosen such that the number of devices expected to transmit during the second discovery interval is less than a capacity of the second discovery interval with at least a first probability.

27. The apparatus of claim 23, further comprising:
   means for determining a wake-up time based on the first discovery message
   means for entering a sleep or power-save mode after transmitting the discovery trigger message; and
   means for waking up at the determined wake-up time.

28. The apparatus of claim 23, wherein the first discovery message is further configured to indicate the paging interval start time.

29. The apparatus of claim 23, wherein the discovery trigger message is configured to request discovery packets associated with the device cluster.

30. The apparatus of claim 23, wherein the discovery trigger message comprises a broadcast frame.

31. The apparatus of claim 23, wherein the discovery trigger message comprises a unicast frame addressed to the first device.

32. The apparatus of claim 23, further comprising means for the discovery trigger message at a transmission time based on contention for a medium beginning at a random start time.

33. The apparatus of claim 23, further comprising means for the discovery trigger message at a transmission time based on contention for a medium beginning at a start time during a duration of the first discovery interval.

34. A non-transitory computer-readable medium comprising code that, when executed, causes an apparatus to:
   receive a first discovery message from a first device of a device cluster comprising a plurality of devices during a first discovery interval, the first discovery message comprising information associated with the device cluster;
   transmit a discovery trigger message in response to receiving the first discovery message, wherein the discovery trigger message is transmitted to trigger at least one device of the device cluster to transmit one or more discovery messages, wherein the discovery trigger message is transmitted at a transmission time based on contention for a medium; and
   receive a second discovery message from at least one device of the device cluster during a second discovery interval, the second discovery message configured to advertise a plurality of services provided by the at least one device of the device cluster in response to the discovery trigger message.

35. The medium of claim 34, wherein the first discovery message is received periodically.

36. The medium of claim 34, wherein the second discovery interval is selected from a number (K) of discovery intervals over which discovery messages are spread.

37. The medium of claim 36, wherein the number (K) is chosen such that the number of devices expected to transmit during the second discovery interval is less than a capacity of the second discovery interval with at least a first probability.

* * * * *